US006671065B1

(12) United States Patent
Salgado et al.

(10) Patent No.: US 6,671,065 B1
(45) Date of Patent: Dec. 30, 2003

(54) METHOD AND APPARATUS TO OPTIMIZE TRANSITION OF RESOURCES FROM A LOWER PRIORITY TO A HIGHER PRIORITY JOB

(75) Inventors: David L. Salgado, Victor, NY (US); Rodney L Turmon, Rochester, NY (US); Nicholas M. Lamendola, Lima, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,150

(22) Filed: Nov. 29, 1999

(51) Int. Cl.⁷ .......................... G06F 15/00; G06F 17/30
(52) U.S. Cl. .................. 358/1.16; 358/1.15; 707/10
(58) Field of Search ............... 358/1.15, 1.16; 707/10

(56) References Cited

U.S. PATENT DOCUMENTS

| | | | |
|---|---|---|---|
| 3,957,071 A | 5/1976 | Kenner | 135/47 |
| 4,821,107 A | 4/1989 | Naito et al. | 358/256 |
| 4,947,345 A | 8/1990 | Paradise et al. | 364/519 |
| 5,021,892 A | 6/1991 | Kita et al. | 358/468 |
| 5,047,955 A | 9/1991 | Shope et al. | 364/519 |
| 5,113,355 A | 5/1992 | Nomura | 395/109 |
| 5,170,340 A | 12/1992 | Prokop et al. | 364/143 |
| 5,175,633 A | 12/1992 | Saito et al. | 358/406 |
| 5,206,735 A | 4/1993 | Guaronski et al. | 358/296 |
| 5,223,948 A | 6/1993 | Sakurai et al. | 358/404 |
| 5,276,799 A | 1/1994 | Rivshin | 395/162 |
| 5,299,296 A | 3/1994 | Paladino et al. | 395/112 |
| 5,307,458 A | 4/1994 | Freiburg et al. | 395/162 |
| 5,327,526 A | 7/1994 | Nomura et al. | 395/115 |
| 5,377,016 A | 12/1994 | Kashiwagi et al. | 358/403 |
| 5,436,730 A | 7/1995 | Hube | 358/401 |
| 5,535,009 A | 7/1996 | Hansen | 358/296 |
| 5,563,986 A | 10/1996 | Suzuki | 395/114 |
| 5,592,671 A | 1/1997 | Hirayama | 395/674 |
| 5,717,842 A * | 2/1998 | Ambalavanar et al. | 358/1.16 |
| 5,923,826 A | 7/1999 | Grzenda et al. | 395/114 |
| 5,930,465 A | 7/1999 | Bellucco et al. | 395/114 |
| 5,970,224 A * | 10/1999 | Salgado et al. | 358/1.16 |
| 6,466,935 B1 * | 10/2002 | Stuart | 707/10 |
| 6,501,559 B1 * | 12/2002 | Salgado et al. | 358/1.15 |
| 6,570,670 B1 * | 5/2003 | Salgado et al. | 358/1.15 |

FOREIGN PATENT DOCUMENTS

| | | |
|---|---|---|
| EP | 0 525 783 A2 | 2/1993 |
| JP | 58-152821 | 8/1983 |

* cited by examiner

*Primary Examiner*—Kimberly A. Williams
*Assistant Examiner*—Saeid Ebrahimi
(74) *Attorney, Agent, or Firm*—Perman & Green, LLP

(57) ABSTRACT

A method and apparatus for prioritizing the use of multi-functional printing system's basic processing resources. The printing system employs a controller with an improved job contention manager (JCM). A plurality of basic resources of the printing system are provided with a queue. One or more job services, at desired times, signals the JCM to carry out a sub-job of a given job. The signal for each of the sub-jobs includes information about the respective sub-job and its priority. Responsive to the signal from the job service the JCM adds a corresponding basic resource sub-job to the queues of each basic resource which the sub-job will require to perform the sub-job. Each respective sub-job is ready for processing, when it is first in line in all the queues of all the basic resources required to perform the sub-job.

13 Claims, 15 Drawing Sheets

METHOD AND APPARATUS TO OPTIMIZE TRANSITION OF RESOURCES FROM A LOWER PRIORITY TO A HIGHER PRIORITY JOB

CROSS-REFERENCES TO RELATED APPLICATIONS

The present application is related in subject matter to and cross-referenced with U.S. patent application Ser. No. 09/450146, entitled METHOD AND APPARATUS FOR MANAGING JOB CONTENTION FOR SYSTEM RESOURCES IN AN ELECTRONIC REPROGRAPHIC SYSTEM WHERE IMAGES ARE MULTI-BANDED, filed by Salgado et al., U.S. patent application Ser. No. 08/550053, entitled METHOD AND APPARATUS TO ENABLE PROCESSING MULTIPLE CAPABILITIES FOR A SUB-JOB WHEN USING A SET OF COMMONLY SHARED RESOURCES, filed by Salgado et al., U.S. patent application Ser. No. 09/450151 , entitled METHOD AND APPARATUS FOR PROCESSING A HIGH PRIORITY RESOURCE REQUEST IN A SYSTEM USING A SET OF SHARED RESOURCES, filed by Salgado et al., U.S. patent application Ser. No. 09/444153, entitled METHOD AND APPARATUS FOR MANAGING JOB CONTENTION FOR SYSTEM RESOURCES IN AN ELECTRONIC REPROGRAPHIC SYSTEM, filed by Salgado et al., U.S. patent application Ser. No. 09/450148, entitled METHOD AND APPARATUS TO IMPROVE SYSTEM CONCURRENCY FOR A JOB USING A SET OF COMMONLY SHARED RESOURCES SUCH THAT A SPECIFIC RESOURCE IS USED ONLY FOR A PORTION OF THE JOB, filed by Salgado et al., U.S. patent application Ser. No. 09/450145, entitled METHOD AND APPARATUS FOR MANAGING JOB CONTENTION FOR SYSTEM RESOURCES IN AN ELECTRONIC REPROGRAPHHIC SYSTEM WHERE IMAGES ARE MULTIBANDED, filed by Salgado et al., and U.S. patent application Ser. No. 09/450149, entitled METHOD AND APPARATUS TO ENABLE JOB STREAMING FOR A SET OF COMMONLY SHARED RESOURCES, filed by Salgado et al., which applications, except for U.S. patent application Ser. No. 09/450146, were filed on the same day as the present Application. The disclosures of the above-mentioned applications are incorporated herein by reference.

BACKGROUND OF THE INVENTION

1. Field of the Invention

This invention relates generally to a multifunctional printing system with one or more queues and, more particularly, to a job contention management architecture which manages the printing system's resources among multiple jobs with improved efficiency.

2. Brief Description of Earlier Developments

Electronic printing systems typically include an input section, sometimes referred to as an input image terminal ("IIT"), a controller, and an output section or print engine, sometimes referred to as an image output terminal ("IOT"). In one type of electronic printing system, manufactured by Xerox® Corporation, known as the DocuTech® electronic printing system, a job can be inputted to the printing system from, among other sources, a network or a scanner. An example of a printing system with both network and scanner inputs is found in the following patent:
U.S. Pat. No. 5,170,340
Patentees: Prokop et al.
Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:
U.S. Pat. No. 5,047,955
Patentees: Shope et al.
Issued: Sep. 10, 1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.
U.S. Pat. No. 3,957,071
Patentee: Jones
Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:
U.S. Pat. No. 4,821,107
Patentees: Naito et al.
Issued: Apr. 11, 1989
U.S. Pat. No. 5,021,892
Patentees: Kita et al.
Issued: Jun. 4, 1991
U.S. Pat. No. 5,175,633
Patentees: Saito et al.
Issued: Dec. 29, 1992
U.S. Pat. No. 5,223,948
Patentees: Sakurai et al.
Issued: Jun. 29, 1993
U.S. Pat. No. 5,276,799
Patentee: Rivshin
Issued: Jan. 4, 1994
U.S. Pat. No. 5,307,458
Patentees: Freiburg et al.
Issued: Apr. 26, 1994

Multifunctional copying devices are typically adapted to store a plurality of jobs for eventual printing. In one example, jobs are ordered for printing in an arrangement referred to as a "print queue". Xerox Network Systems have employed the concept of the print queue for at least a decade to manage jobs at network printers. Further teaching regarding network printing is provided in the following patent:
U.S. Pat. No. 5,436,730
Patentee: Hube
Issued: Jul. 25, 1995

The concept of a print queue is integral to the operation of various digital reproduction systems. Through appropriate queue management, a job currently in the process of being printed can be interrupted with an interrupt job in a manner disclosed by the following:

U.S. Pat. No. 5,206,735
Patentees: Gauronski et al.
Issued: Apr. 27, 1993

Referring particularly to the '735 Patent, a special job is obtained from a mass memory, shown by way of a "job file", and inserted into the queue at a "logical point" with respect to the job currently being processed. When printing reaches the logical point at which the special job was inserted, the job currently being processed is interrupted so that the special job is processed. Upon completion of the processing of the special job, processing of the interrupted job is resumed. The queue disclosed in the '735 Patent is managed, in the normal case, on a first-come-first-serve ("FIFO") basis except when special or interrupt jobs are inserted into the queue. In the illustrated embodiment of the '735 Patent, the interrupt job is inserted into the queue as described above except when an interrupt job is currently in the process of printing. When an interrupt job is currently printing, a second interrupt job is placed behind the interrupt job in process. Essentially, priority is given to the interrupt job currently in process. The concerns associated with interrupting a first interrupt job with a second interrupt job are also addressed in the following patent:

U.S. Pat. No. 5,535,009
Patentee: Hansen
Issued: Jul. 9, 1996

The queue management arrangement of the '735 Patent is not optimally suited for use in a multifunctional context because it does not differentiate among job types for the purpose of managing the queue. Consequently, a print job cannot, in many common instances, be given priority over a copy job, or vice versa. Systems particularly well suited for use with a multifunctional printing systems are disclosed by the following references:

U.S. Pat. No. 4,947,345
Patentees: Paradise et al.
Issued: Aug. 7, 1990
Japanese Application 58-152821
Published: Aug. 22, 1983

Referring particularly to the '345 Patent, a first queue is used to store copy and print jobs, while a second queue, communicating with the first queue, is used to store facsimile ("fax") jobs in parallel with the first queue. After a pre-selected number of one or more fax jobs is stored in the second queue, the stored job(s) is placed in front of the jobs of the first queue so that the one or more fax jobs can be printed ahead of the currently queued copy/print jobs. While the queue management scheme of the '345 Patent accommodates for job differentiation, it only does so in a limited manner. For instance, the fax queue can be given preferential treatment relative to the copy/print queue, so that one or more fax jobs can be printed ahead of a copy or print jobs. No mechanism for treating a given copy or print job preferentially, however, is suggested. Even though U.S. Pat. No. 5,511,150 to Beaudet et al. (Issued Apr. 23, 1996) accommodates for preferential treatment of copy jobs relative to print jobs, it does not do so in a queue context as discussed in the references above. Additionally, in the approach of the '345 Patent, a copy or print job can get "stuck" in the copy/print job queue when multiple fax jobs are given preferential processing treatment relative to the copy/print jobs U.S. Pat. No. 5,113,355
Patentee: Nomura
Issued: May 12, 1992

Referring to the 355 patent, it discloses a printer control system for enabling queue identifiers, which identify different print jobs, to be sorted such that those queue identifiers identifying print jobs which require fonts that are already loaded in the print server are placed at the head of a print list, and those queue identifiers identifying print jobs which require fonts that are not loaded in the print server are placed at the end of the print list. The print jobs are then processed in the order that the queue identifiers appear on the print list. When a print job to be processed requires fonts that are not loaded into the system a message is displayed on a display unit in order to inform the operator which fonts need to be loaded into the system.

U.S. Pat. No. 5,327,526
Patentee: Nomura et al.
Issued: Jul. 4, 1994

Referring to the 526 patent it discloses a print job control system which processes print requests to set an order of priority for printing print jobs. A print job manager checks the print request and determines what print option is selected and manipulates the queue identifiers associated with respective print jobs and enters them into a print queue table. One feature allows changing the print order thereby overriding the designated print option. Another feature allows for increasing the priority of low priority jobs regardless of the designated print option assuring that the low priority jobs will be printed.

U.S. Pat. No. 5,377,016
Patentee: Kashiwagi et al.
Issued: Dec. 27, 1994

Referring to the 016 patent there is disclosed a control circuit which receives advance data representing a predetermined number of copy jobs to be provided from a scanner and data representing a predetermined number of print jobs to be provided from external equipment. The control circuit causes each of the copy jobs and print jobs on the basis of such data to be queued, and the jobs to be processed in a time divisional and parallel manner. Basically, the control circuit gives higher priority to the copy job. The priority order can be changed according to an instruction from a user interface. When a current job has been suspended, the control circuit causes a succeeding job to be processed earlier.

U.S. Pat. No. 5,923,826
Patentee: Grzenda et al.
Issued: Jul. 13, 1999

Referring to the 826 patent there is disclosed a printing system comprising a digital reproduction system communicating with a remote document processing station by way of a print server. The printing system includes a first queue of first jobs to be executed with the digital reproduction system maintained at the print server and a second queue of second jobs to be executed with the digital reproduction system maintained at the digital reproduction system. The printing system further includes a queue process communicating with both the first and second queues for forming a composite queue to reflect an order in which the first and second jobs of the first queue and the second queues are to be executed with the digital reproduction system. A representation of the composite queue is then displayed at a user interface disposed at the remote document processing station.

U.S. application Ser. No. 09/014,486
Applicant: Salgado et al.
Pending

A method is provided for a multifunctional printing system in which a first job, developed at a first service, and a second job, developed at a second service are placed in a queue for processing. A first value is assigned to the first job and a second value is assigned to the second job, with the first and second values varying in magnitude as a function of the first and second services. In one example, the first job is placed in the queue and a portion thereof is processed. Subsequently, the second job is placed in the queue and processing of the first job is interrupted by the second job if the second value is greater in magnitude than the first value.

The aforenoted queuing approaches, while well intended for their limited purposes, lack the sort of efficient queue management that is required to make multifunctional printing systems having shared resources fully productive. Multifunction printing system's capabilities and uses are expanding at an ever-increasing rate. It is desirable to provide a multifunctional printing system that gives improved productivity by utilizing queue management at the capability and resource sub-job levels in order to maximize the productivity of the system. At the same time, it is desirable to provide a queue management system for a multifunctional printing system facilitating the efficient thruput of all types of jobs which might be encountered by the multifunctional printing system.

The Xerox Corporation Digital Copier Multifunction Systems comprising the DC 240 ST and the DC 265 ST include a Job Contention Manager which provides queue management at the Basic Job Service level. This approach has the ability to concurrently process sub-jobs which do not conflict at the basic resource level. For example, a scan sub-job and a mark sub-job can be carried out concurrently, however, all the capabilities associated with each basic resource for the sub-job are tied up until the sub-job is completed. A more productive approach as in accordance with this invention releases capabilities to other sub-jobs when they are not being used or are required by higher priority sub-jobs. This is accomplished in accordance with a preferred embodiment of this invention by providing job contention management at the lower level of capability job requests with both capability resource queues and basic resource queues.

The disclosure of each patent or application mentioned or discussed in the above Background is incorporated herein by reference.

SUMMARY OF THE INVENTION

In accordance with one preferred embodiment of the presently disclosed invention there is provided a method and apparatus for prioritizing the use of multifunctional printing system's basic processing resources to efficiently transition resources from a lower priority sub-job to a higher priority sub-job. In accordance with a preferred aspect of this invention, the printing system employs a controller with an improved job contention manager (JCM).

The process comprises providing each of a plurality of basic resources of the printing system with a queue. One or more job services, at desired times, sends a signal, comprising a "propose", to the JCM to carry out a sub-job of a given job. The propose for each of the sub-jobs includes information about the respective sub-job's priority. Responsive to the propose from the job service the JCM adds a corresponding basic resource sub-job to the queues of each basic resource which the sub-job will require to perform the sub-job.

One of the job services sends a first sub-job propose to the JCM for a first sub-job. The JCM determines the state of the first sub-job such that if the first sub-job is at the top of all the queues of all the basic resources required to perform the first sub-job its state is active and the first sub-job is processed. The JCM then determines the state of the first sub-job propose, such state being "in progress" if the proposed sub-job is being actively processed or the state is "not active" if the proposed sub-job is not being actively processed. A job service then sends the JCM a second propose for a second sub-job having a higher priority than the first sub-job. Substantially immediately the JCM transitions the basic resources from the first sub-job to the second sub-job if the state of the first sub-job propose is "not active". However, if the state of the first sub-job's propose is "in progress" then the resources are not transitioned until the state of the first sub-job's propose is set to "not active".

In accordance with another alternative preferred embodiment of the present invention there is provided a method of managing the processing of a plurality of jobs in a multifunctional printing system as described above in which jobs are inputted for processing at one or more job services. The process comprises providing a controller with a job contention manager (JCM) for prioritizing the printing system's basic processing resources to efficiently transition resources from a lower priority sub-job to a higher priority sub-job. A plurality of capability job resources are provided for carrying out the one or more job services. A plurality of basic job resources of the printing system are also provided. Each capability job resource contains a list of the basic job resources it needs to carry out its capability and each basic job resource contains a list of the capability job resources that depend upon it. A job queue is provided for each capability job resource and each basic job resource.

One or more job services, at desired times, sends a signal, comprising a "propose", to the JCM to carry out a sub-job of a given job. The propose for each of the sub-jobs includes information about the respective sub-job's priority (FIFO or job based priority). Responsive to such a propose the JCM creates a capability sub-job containing the information and adds the capability sub-job, based on priority, to the queue of the respective capability job resource. Responsive thereto, the JCM adds, based on priority, a basic resource sub-job to the queues of each basic job resource which the capability sub-job will require.

As in the previous alternative, one of the job services sends a first sub-job propose to the JCM for a first sub-job. The JCM determines the state of the first sub-job such that if the first sub-job is at the top of all the queues of all the basic resources required to perform the first sub-job its state is active and the first sub-job is processed. The JCM then determines the state of the first sub-job propose, such state being "in progress" if the proposed sub-job is being actively processed or the state is "not active" if the proposed sub-job is not being actively processed. A job service then sends the JCM a second propose for a second sub-job having a higher priority than the first sub-job. Substantially immediately the JCM transitions the basic resources from the first sub-job to the second sub-job if the state of the first sub-job propose is "not active". However, if the state of the first sub-job's propose is "in progress" then the resources are not transitioned until the state of the first sub-job's propose is set to "not active".

An apparatus is provided in accordance with a preferred embodiment of this invention for prioritizing the use of a multifunctional printing system's basic processing resources to efficiently transition resources from a lower priority sub-job to a higher priority sub-job. The apparatus employs a controller with a job contention manager (JCM). The apparatus includes: means for providing a plurality of basic resources of the printing system with each such resource having a queue and means for one or more job services, at desired times, to signal or "propose" to the JCM to carry out a sub-job of a given job, the propose for each of the sub-jobs including information about the sub-job's priority.

The JCM includes: means responsive to the propose for adding a corresponding basic resource sub-job to the queues of each basic resource which the sub-job will require to perform the sub-job; means responsive to one of the job services sending to the JCM a first sub-job propose for a first sub-job for determining the state of the first sub-job, such that if the first sub-job is at the top of all the basic resource job queues for all the basic resources it requires, its state is "active" and the first sub-job is processed by the basic resources; means for determining the state of the first sub-job propose, the state being "in progress" if the proposed sub-job is being actively processed or the state being "not active" if the proposed sub-job is not being actively processed; and resource transitioning means, responsive to one of the job services sending to the JCM a second sub-job propose for a second sub-job using at least one basic resource required by the first proposed sub-job, the second proposed sub-job having a higher priority than the first sub-job, for substantially immediately transitioning the at least one basic resource for use by the second proposed sub-job, if the state of the first sub-job's propose is "not active".

An alternative apparatus in accordance with a preferred embodiment of this invention is provided for managing the processing of a plurality of jobs in a multifunctional printing system to efficiently transition resources from a lower priority sub-job to a higher priority sub-job, in which at least one job is inputted for processing at one or more job services. The apparatus includes a controller with a job contention manager (JCM) for prioritizing the printing system's basic processing resources.

The apparatus includes: a database which is associated with the JCM. The database includes a plurality of capability job resources for carrying out the one or more job services and a plurality of basic job resources of the printing system, with each capability job resource containing a list of the basic job resources it needs to carry out its capability and each basic job resource containing a list of the capability job resources that depend upon it. The database includes a sub-job queue for each capability resource and each basic resource.

Means are provided, for a job service, at a desired time, to send a signal, comprising a "propose", to the JCM to carry out a sub-job of the respective first or second jobs, with the propose for each of the sub-jobs including information about the respective sub-job's priority. The JCM includes: means responsive to a propose, for creating in the database a capability sub-job containing the information and adding the capability sub-job, based on priority, to the queue of the respective capability job resource and means responsive to the capability sub-job creating means for adding, based on priority, the sub-job to the queues of each basic job resource, which the capability sub-job will require.

As in the previous alternative the JCM also includes: means responsive to one of the job services sending to the JCM a first sub-job propose for a first sub-job, for determining the state of the first sub-job, such that if the first sub-job is at the top of all the basic resource job queues for all the basic resources it requires, its state is "active" and the first sub-job is processed by the basic resources; means for determining the state of the first sub-job propose, the state being "in progress" if the proposed sub-job is being actively processed or the state being "not active" if the proposed sub-job is not being actively processed; and resource transitioning means, responsive to one of the job services sending to the JCM a second sub-job propose for a second sub-job using at least one basic resource required by the first proposed sub-job, the second proposed sub-job having a higher priority than the first sub-job, for substantially immediately transitioning the at least one basic resource for use by the second proposed sub-job, if the state of the first sub-job's propose is "not active".

The prioritization approach used by the JCM in the process and apparatus of this invention can be FIFO or a combination of FIFO and job based priority as desired.

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
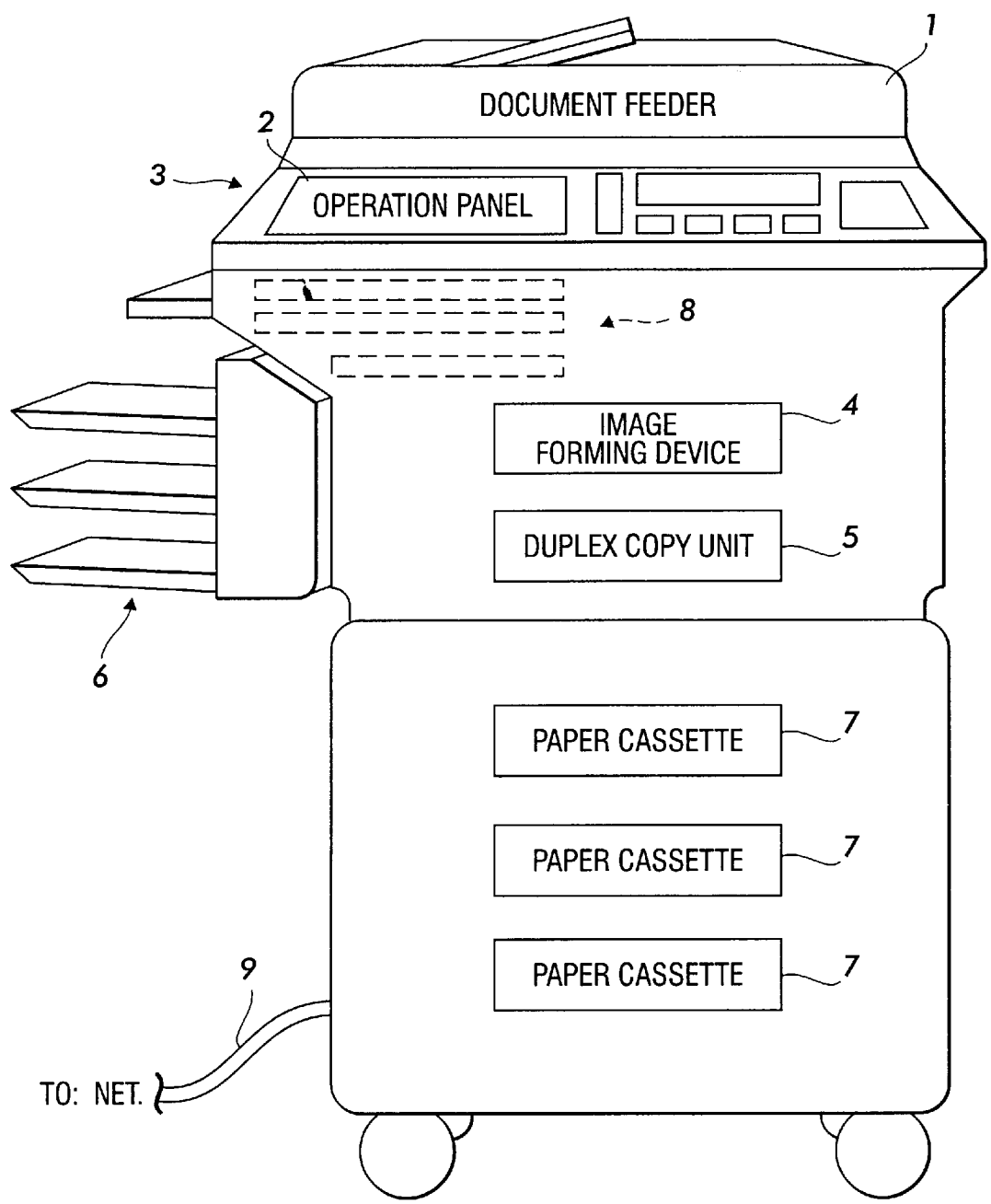
FIG. 1 is a perspective view of a networked digital copier suitable for receiving a job developed in accordance with the present invention.

Referring to FIG. 1 of the drawings, there is shown a digital copier system of a known type suitable for use with a preferred embodiment of the invention. As shown, the system includes a document feeder 1 and an operation (and display) panel 2. After desired conditions have been entered on the operation panel 2, the document feeder 1 conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper by an electrophotographic, thermosensitive, heat transfer, ink jet or similar conventional system.

As a paper is fed from any one of paper cassettes 7 to the image on forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a output device 6 in order of page or page by page.

Applications, generally 8, share the document feeder 1, operation panel 2, image reading device 3, image forming device 4, duplex unit 5, output device 6, and paper cassettes 7 which are the resources built in the copier system. As will appear, the applications include a copier application, a printer (IOT) application, a facsimile (Fax) application and other applications. Additionally, the digital copier system is coupled with a network by way of a conventional network connection 9.

Figure 2:
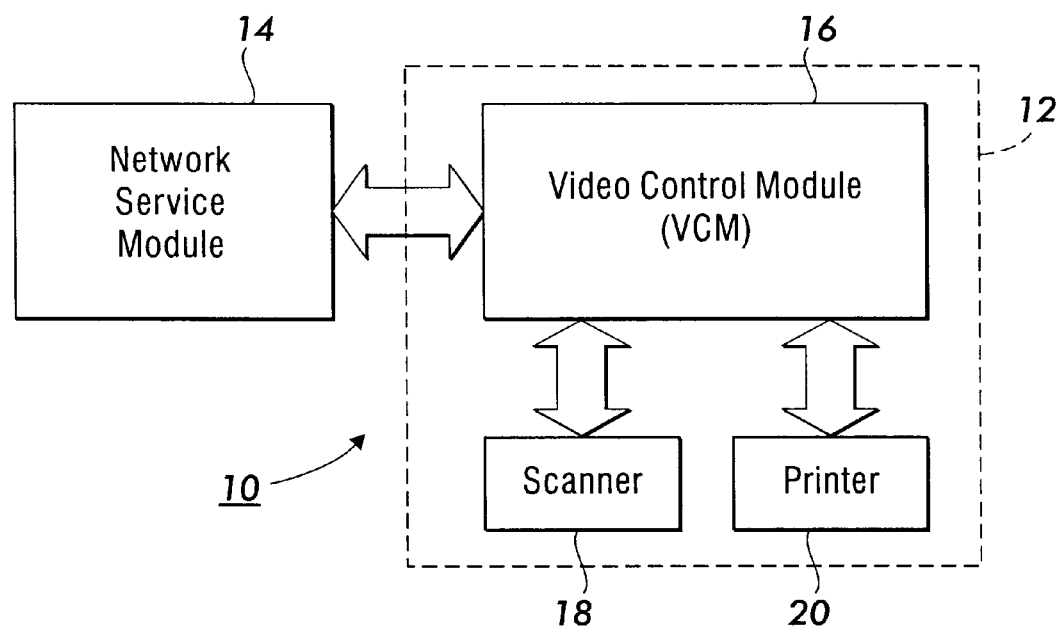
FIG. 2 is a block diagram depicting a multifunctional, network adaptive printing machine.

Referring to FIG. 2, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system (IP) 22 (FIG. 3), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 3) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
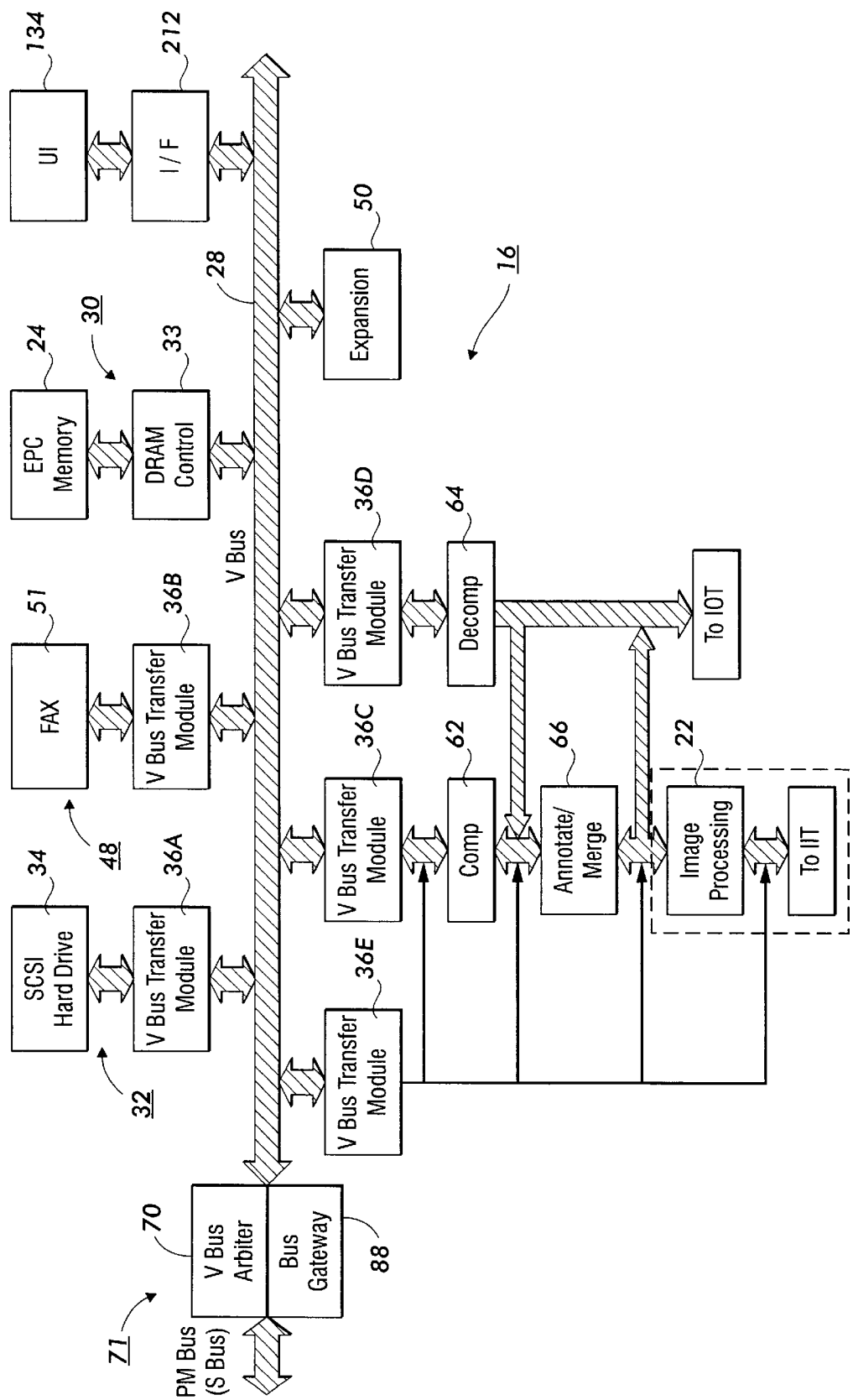
FIG. 3 is a block diagram of a video control module for the printing machine of FIG. 2.

Referring specifically to FIG. 3, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 Mbytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules, however, any desired amount of memory could be employed. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way of the transfer module 36a through use of a suitable interface and a SCSI line.

Figure 4:
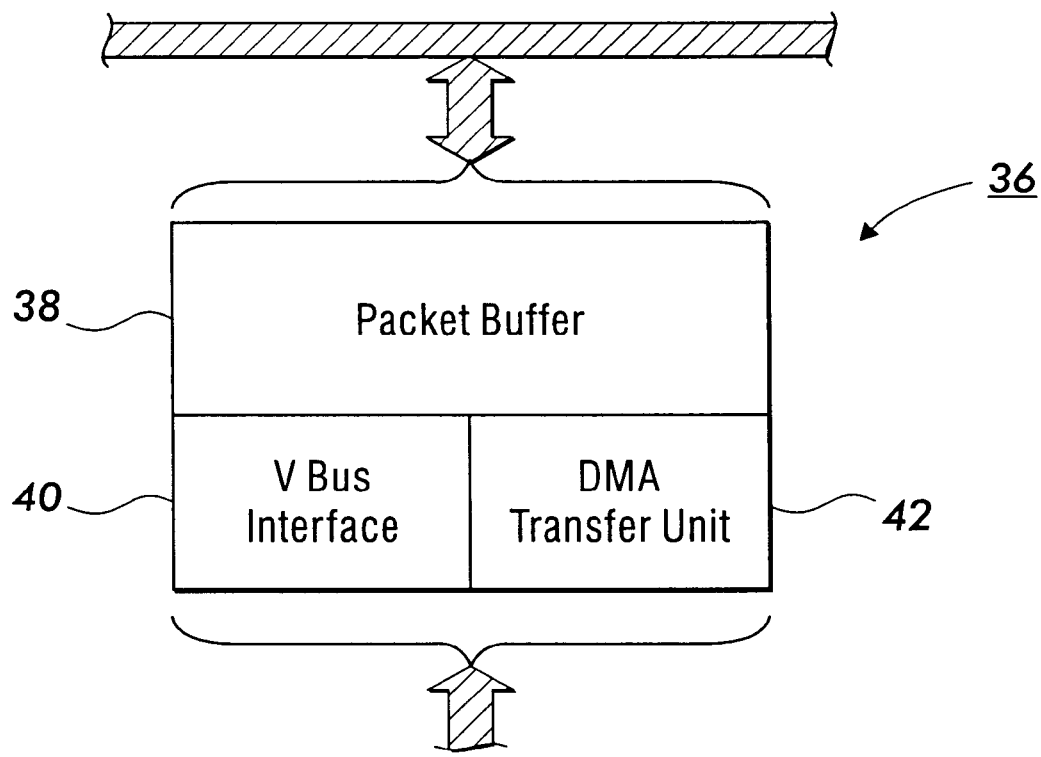
FIG. 4 is a block diagram of a transfer module used in conjunction with the printing machine of FIG. 3.

Referring to FIG. 4, the structure of one of the transfer modules 36 is discussed in further detail. The illustrated transfer module of FIG. 4 includes a packet buffer 38, a VBus interface 40 and DMA transfer unit 42 . The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can be programmed to handle packets of up to 64 Bytes Preferably, the packet size would be reduced for times when the VBus is relatively busy and increased for times when activity on the bus is relatively low.

Figure 6:
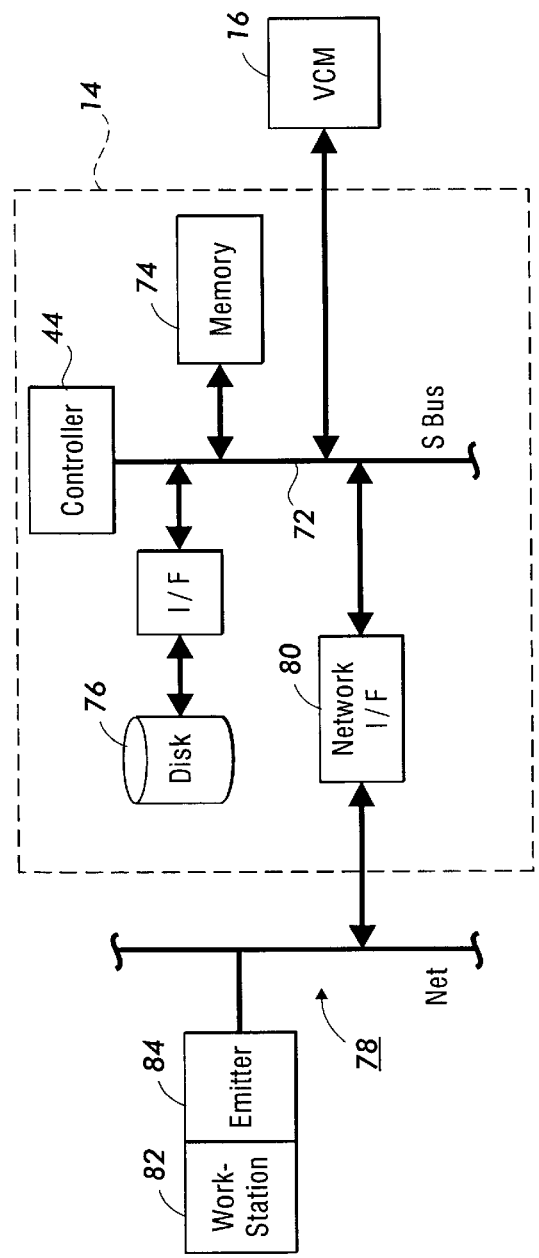
FIG. 6 is a block diagram of a network controller for the printing machine of FIG. 2.

Adjustment of the packet size is achieved with the VBus interface 40 (FIG. 4) and a system controller 44 (FIG. 6). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

More particularly, image transfer is facilitated with a DMA transfer unit which employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 5:
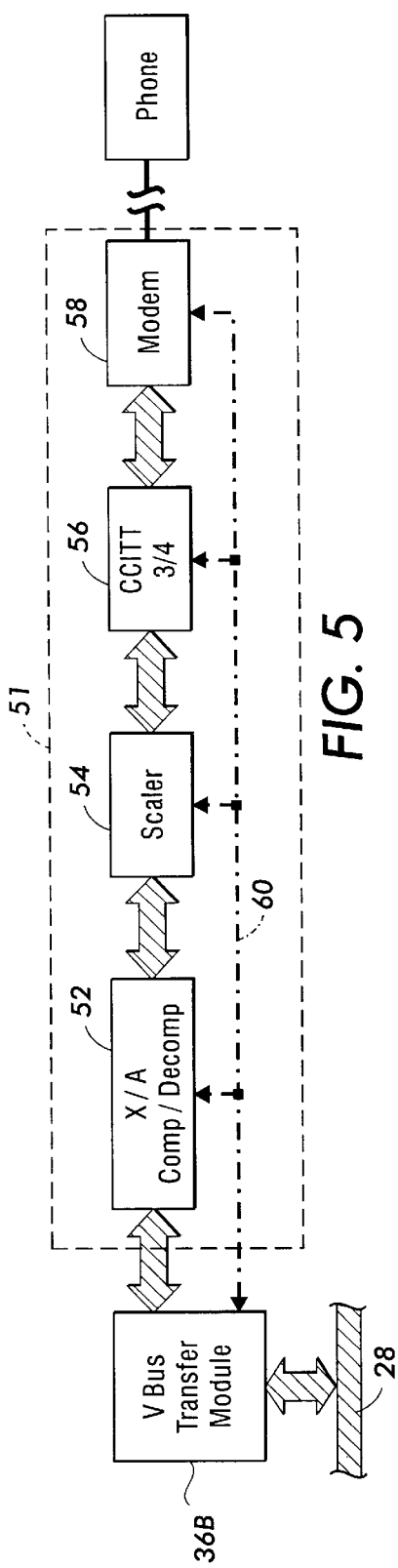
FIG. 5 is a block diagram of a facsimile card used in conjunction with the video control module of FIG. 3.

Referring to FIGS. 2 and 3, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 5, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 5, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 3, the IIT 18 and IOT 20 are operatively coupled to the VBus 28 by way of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module. As further illustrated by FIG. 3, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment. Thresholding and screening are common imaging functions relating to the concept of applying an image screen to improve the quality of the image. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 3, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 6, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 6, a host memory 74, which preferably assumes the form of DRAM, and a SCSI disk drive device 76 are coupled operatively to the SBus 72. While not shown in FIG. 6, a storage or I/O device could be coupled with the SBus with a suitable interface chip. As further shown in FIG. 6, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. Pat. No. 5,493,634 to Bonk et al. and U.S. Pat. No. 5,226,112 to Mensing et al., the disclosures of both references being incorporated herein by reference. Further details regarding a technique for generating a job in a PDL may be obtained by reference to the following text, the pertinent portions of which are incorporated herein by reference:
PostScript® Language Reference Manual
Second Edition
Addison-Wesley Publishing Co.
1990

Referring again to FIG. 3, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 3, 4 and 6, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet transfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 7:
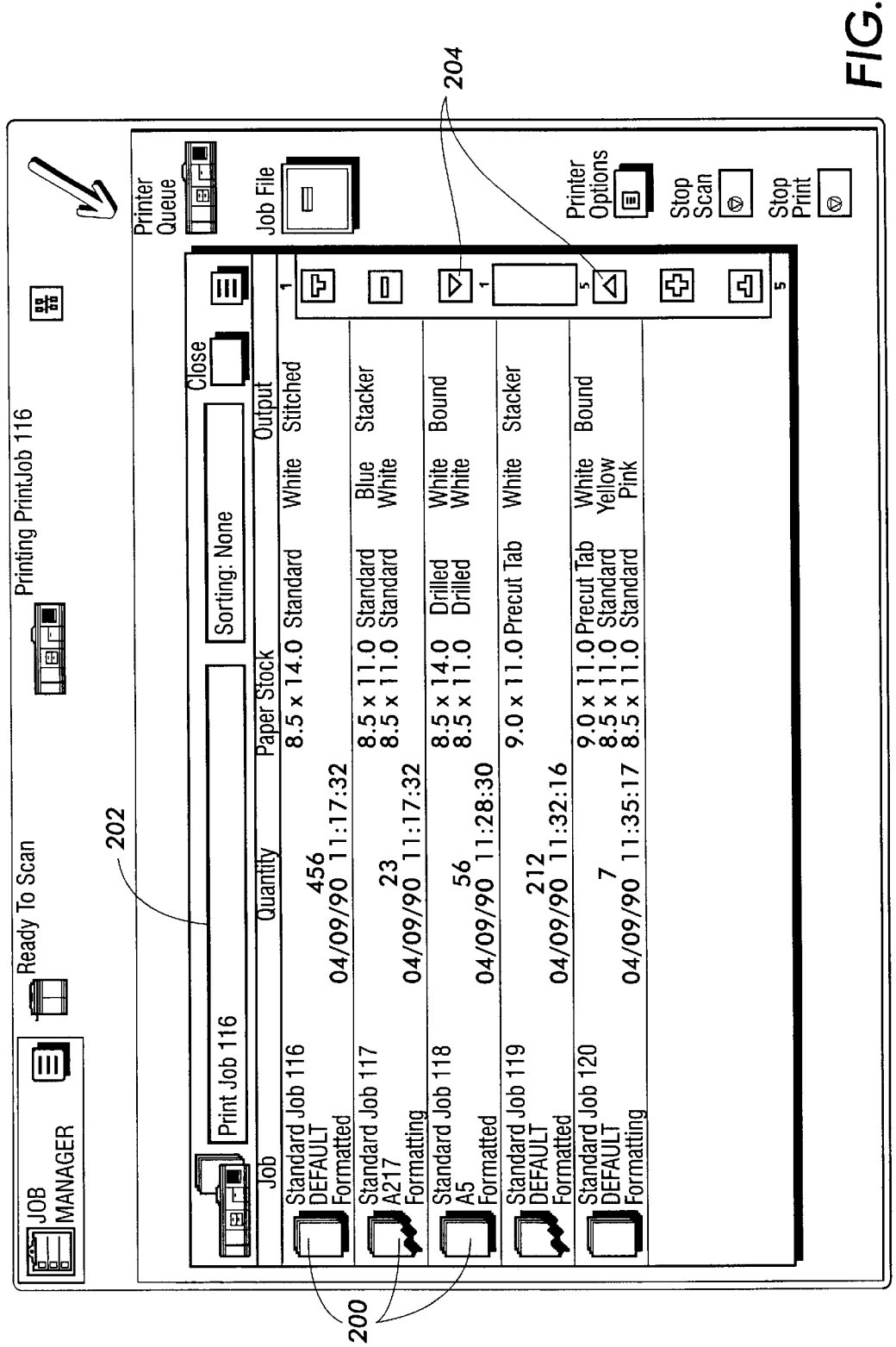
FIG. 7 is an elevation view of a queue used to store jobs pursuant to processing thereof.

As previously noted the Xerox Corporation Digital Copier Multifunction Systems comprising the DC 240 ST and the DC 265 ST include a Job Contention Manager which provides queue management at the External or Basic Job Service levels. Referring to FIG. 7, those systems include a queue of jobs 200 ready for processing with the printer 20 as shown in FIG. 1. As with other conventional print queues, the job currently being printed is displayed in a window 202 and buttons 204 can be employed to scroll the list of jobs up or down. It should be appreciated that in a multifunctional machine of the this type and those discussed in the Background above, more than one queue is employed to accommodate for the various Basic Job Services offered. For example, jobs waiting to be scanned would reside in a scan queue while jobs waiting to be faxed would reside in a fax queue. Essentially the print or mark queue of FIG. 7 may be just one of the plurality of Basic Job Service queues employed in a multifunction printing system. Additionally, it should be appreciated that jobs may be inserted into the queues in a manner consistent with that disclosed by U.S. Pat. No. 5,206,735. Finally, it will be appreciated that the queues could be maintained in, among other locations, the VCM of FIG. 3 or the Network Service Module of FIG. 6.

In any multifunctional product (also referred to below as "MF Engine"), such as the printing system 10 described above, there is always the potential of multiple users requiring access to one or more subsystems at the same time. This access contention can occur in several areas of the MF Engine, either as contention for a single resource e.g., EPC memory 24 (FIG. 3), or as a contention for multiple kinds of resources e.g., EPC memory and IIT. When a contention situation arises, the printing system must respond in a predictable, and controlled manner that satisfies the various users.

In the Xerox DC 240 ST and the DC 265 ST Multifunction Systems, at least two contention management methods are contemplated, as more fully described in U.S. application Ser. No. 09/014,486 to Salgado et al., which is incorporated by reference herein, (hereinafter the "Salgado Application").

1. First In First Out (FIFO) Job Management.

In this method contention is handled on a first come first serve basis. Jobs submitted ahead of other jobs have first use of the required Basic Job Service. Other jobs requesting that service are numerically ordered by their time of arrival and eventually have the opportunity to use the service.

2. Prioritized Job Management

In this method access to resources is managed with a "Key Operator/System Administrator ("KO/SA") defined algorithm. With this algorithm, the KOISA can arrange to have jobs defined according to job type, immediate walkup need, history of interruptions and other relevant factors. The algorithm can be configured to manage job contention in accordance with the desires of a typical printing system user. Since it is flexibly programmable, the algorithm can be made to accommodate for FIFO. In other words, FIFO is a subset of the capabilities of this algorithm.

The Salgado Application discloses at least five job types that are handled by the KO/SA priority algorithm:

1. Copy Print or Walk-Up Jobs: Walk up user jobs requiring the use of the IIT and the corresponding marking resource;
2. Auto Report Print: Reports that are automatically printed, such as reports of machine or copier use, error logs, fax reports, etc. The reports, which are defined by the SA/KO, are printed from memory resources and require marking engine usage;
3. Net Print: Included in this job category are the following:
   a) Jobs arriving from network sources, via the network service module 14 (FIG. 1), which require marking resource,
   b) Network service module (also referred to as "ESS") soft mailbox jobs activated by a walk-up or remote user, and
   c) Any other jobs originating from the ESS or network;
4. Fax Mailbox: Included in this job category are the following:
   a) Fax receives which have been stored on the system for printout at a user's request,
   b) Local reports such as system usage or fax logs, and
   c) Any other jobs originating from the EPC memory 24 (FIG. 3) or the printing system (also referred to as "MFSYS");
5. Fax Print: Incoming Fax jobs that are meant to be printed immediately. Such jobs are captured in EPC memory 24 and then printed immediately.

The approach of the Salgado Application, provides a system job which corresponds to a work request made by a user. The user's work request is made at the MF Engine's user interface or External Job Service (EJS). For example, a copy job corresponds to a user's request to perform a copy operation. Each EJS job breaks down into multiple sub-jobs. Each sub-job corresponds to the work responsible for a basic job operation which is processed by a Basic Job Service (BJS). Copy jobs break down into scan, image processing, and mark sub-jobs.

Processing a job by a Basic Job Service requires use of video hardware. Video hardware includes the compressor, decompressor, ips1 board, input channel, output channel, and loopback channel. Multiple sub-jobs can require the use of the same video hardware. The Job Contention Manager of the Salgado Application manages the use of the video hardware and which sub-job acquires the hardware when a contention decision is required at the level of the Basic Job Service, based on the priority schemes noted above.

The following terminology should be useful in obtaining a more complete understanding of the present description:
Authorized User: a user having a higher authority level than a casual user, but access rights less than that of a KO/SA. This is a reserved authority level intended for VIP Users.

Job Priority: A priority assigned according to job or user type. An exemplary priority scheme, based on job type, is provided in the Salgado Application.

Resource: Any mechanical, electronic or software component required to process a job or sub-job.

Marking Resource: The resource used to print a job on a given media type.

Memory Resource: Types of Read/Write memory used by the printing system, e.g. memories 24, 34 (FIG. 3), 74 and 76 (FIG. 6).

Marked Job: A job which has been printed. This term is more generic than "printed job" and does not imply a particular method used for writing to the type of media.

Next to Print: This is the nomenclature for a job which is at the top of the queue of jobs and under stable/normal conditions, will be the "next to print" from the queue.

Decompressor: Video hardware that decompresses a compressed image back to its "raw" data.

Compressor: Video hardware that compresses an image based on a conventional compression algorithm.

Loopback Channel, Input Channel and Output Channel: Comprise video channels used to physically transfer image data.

ips1: Physical component that performs a number of imaging functions such as reduction, enlargement, lighter, darker, and contrast.

This invention embodies many of the elements disclosed in U.S. patent application Ser. No. 09/450,146, to Salgado et al., entitled METHOD AND APPARATUS FOR MANAGING JOB CONTENTION FOR SYSTEM RESOURCES IN AN ELECTRONIC REPROGRAPHIC SYSTEM, filed of even date herewith, ("Salgado 66 Application") and those elements are included hereafter in an effort to more clearly describe the various embodiments of this invention. This invention proposes an expansion of the method and apparatus described in the Salgado 66 Application to enable the system to efficiently transition resources from a lower priority job to a higher priority job. This invention reduces the time it takes to perform such a transition.

In accordance with this invention an improved method and apparatus for managing contention for a system's resources among multiple sub-jobs is provided, which efficiently transitions the resources from a lower priority sub-job to a higher priority sub-job. In accordance with preferred embodiments of this invention it is possible to: 1) process multiple sub-job requests for resources, 2) provide concurrent job processing when a contention condition does not exit, 3) assign basic resources to a sub-job based on its priority, 4) suspend a sub-job's use of resources in favor of a higher priority job, 5) transfer resources from a lower priority sub-job to a higher priority sub-job, 6) provide quick processing of BJS' video resource request for each image, and 7) expand for additional video resources and video capabilities.

Figure 8:
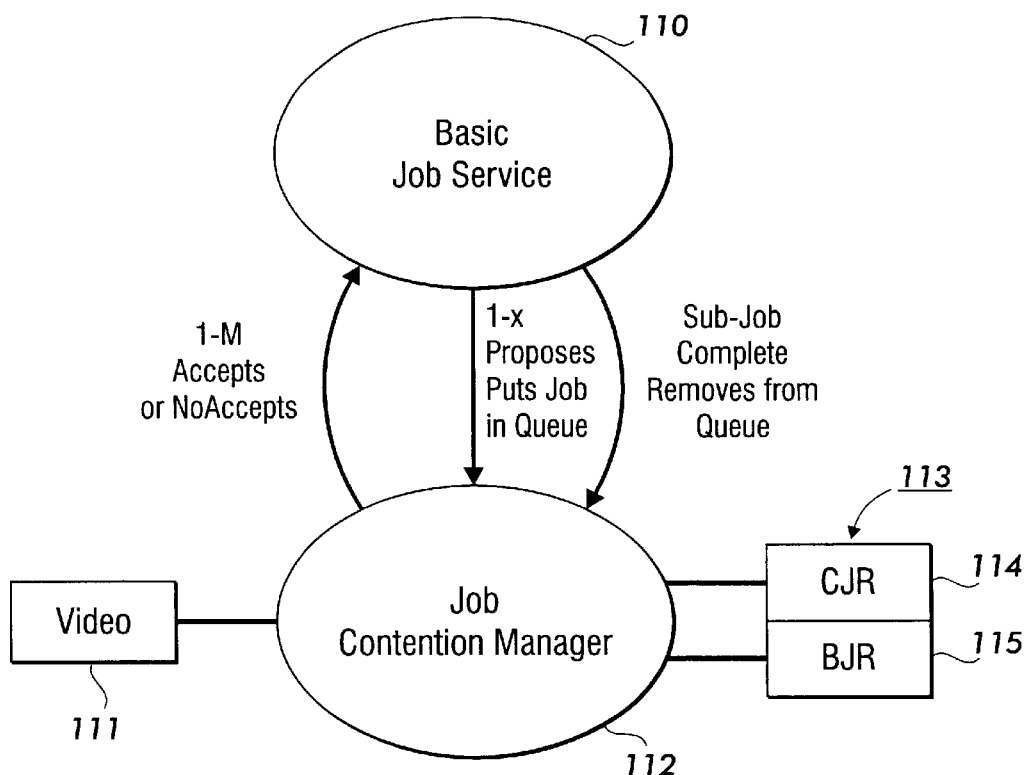
FIG. 8 is a schematic view showing the signal interaction between the Basic Job Service (BJS) and the JCM.

Referring to FIG. 8, the Job Contention Manager (JCM) 112 of this invention controls the allocation of resources at the level of the basic resources. As shown in FIG. 8 it tracks and assigns video resource requests received by the JCM 112 from the BJS 110. The requests between the JCM 112 and the BJS 110 use a Propose/Accept/No Accept protocol. Table 1 provides examples of typical External Job Services and the BJS sub-jobs which they entail for an exemplary Multifunction Printer (MFP). It is within the scope of this invention to provide additional EJS and BJS 110 services as may be desired and Table 1 is provided only by way of Example.

TABLE 1

JOB SERVICES

| EXTERNAL JOB SERVICES | COPY | PRINT | FAX PRINT | FILE | FAX OUT | REPORT PRINT | TEST PATTERN PRINT |
|---|---|---|---|---|---|---|---|
| BASIC JOB SERVICES | Scan ±IP Mark | ESS Input Mark | ESS Input Mark | Scan ±IP ESS Output | Scan ±IP ESS Output | Report Generator Mark | Internal Image Generator Mark |

The Basic Job Service (BJS) breaks up the External Job Service request into a series of sub-job requests as shown in Table 1. As shown in FIG. 8, in accordance with this invention, for each sub-job the BJS 10 calls upon the Job Contention Manager (JCM) 12 with a "Propose" for video resources. The JCM provides a set of video capabilities or Capability Resources (CR) for use by the BJS as exemplified by Tables 2a and 2b. Each CR uses a specific set of video 111 hardware or Basic Resources (BR).

TABLE 2a

VIDEO CAPABILITIES

| CAPABILITY RESOURCES | PRE-SCAN | SCAN COMPRESSED | IP ANNOTATE | MARK DECOMPRESSED |
|---|---|---|---|---|
| BASIC RESOURCES | Loopback Channel IPS1 | Compressor Input Channel | Input Channel Loopback Channel Output Channel Compressor Decompressor | Output Channel Decompress |

TABLE 2b

CAPABILITY RESOURCES

| CAPABILITY RESOURCES | ESS INPUT NONRESCONVERSIONS | ESS OUTPUT | REPORT GENERATOR | INTERNAL IMAGE |
|---|---|---|---|---|
| BASIC RESOURCES | Loopback Channel Compressor | Output Channel | Decompressor Output Channel | IPS1 Input Channel |

Tables 2a and 2b provide examples of typical Capability Resources (CR) and the Basic Resources (BR) or video resources which they utilize in an exemplary Multifunction Printer (MFP). It is within the scope of this invention to provide additional CRs and BRs as may be desired and Tables 2a and 2b are provided only by way of Example. By way of example, as shown in Tables 2a and 2b the Scan capability (CR) uses the compressor and the input channel Basic Resources and the ESS Input capability (CR) uses the loopback channel and compressor BRs.

The basic architecture of the system for carrying out the method of this invention for managing contention for a system's resources among multiple sub-jobs and how those resources are shared will now be described in detail by reference to FIGS. 8, 9, 10 and 11. The flow diagrams shown in these Figures comprise a first preferred embodiment of the invention which uses a simple First In/First Out (FIFO) prioritization scheme.

Referring to FIG. 8, when the Basic Job Service 110 is ready to process a sub-job, it sends an image "Propose" as described above, for each image it needs to process, to the Job Contention Manager 112. The Job Contention Manager 112 maintains at least a two-level interconnected database 113. The first level 114 corresponds to the Capability Resources (CR). The second level 115 corresponds to the Basic Resources (BR) which are essentially the video resources (Video 111). The database 113 may have any desired number of levels and the two level database is described by way of example. Each Capability Resource in the database 114 contains a list of the Basic Resources it needs. Correspondingly, each Basic Resource in the database 115 maintains a list of the CRs that depend upon it. This interconnected database is created on system power up.

The Job Contention Manager 112 also owns the system's contention algorithm (settable by SA/KO) which in a preferred embodiment is essentially similar to the algorithm proposed in the Salgado Application, which is incorporated by reference herein, however, it may be any desired contention algorithm as determined by the SA/KO. In the Salgado Application the contention algorithm is FIFO or job service priority based or a combination of both. When a job is created, the job contains priority ordering data elements including priority, submission time, and last modification time.

When a Basic Job Service 110 is ready to process a sub-job, the BJS 110 calls or signals the JCM 112 with an image "Propose" request as in FIG. 8 for each image it needs to process. The "Propose" request preferably includes the job identifier, its priority information, the video capability required, and the requesting BJS identification. For example, the Scan BJS needs to scan a copy job (id: 3-1) form the DADH (document handler). For each image the scanner needs to input, the Scan BJS 110 calls the JCM 112 with a "Propose" (e.g. BJS service: Scan, job: 3-1, job priority: XXX, capability: ScanCompressed, . . . )

Figure 9:
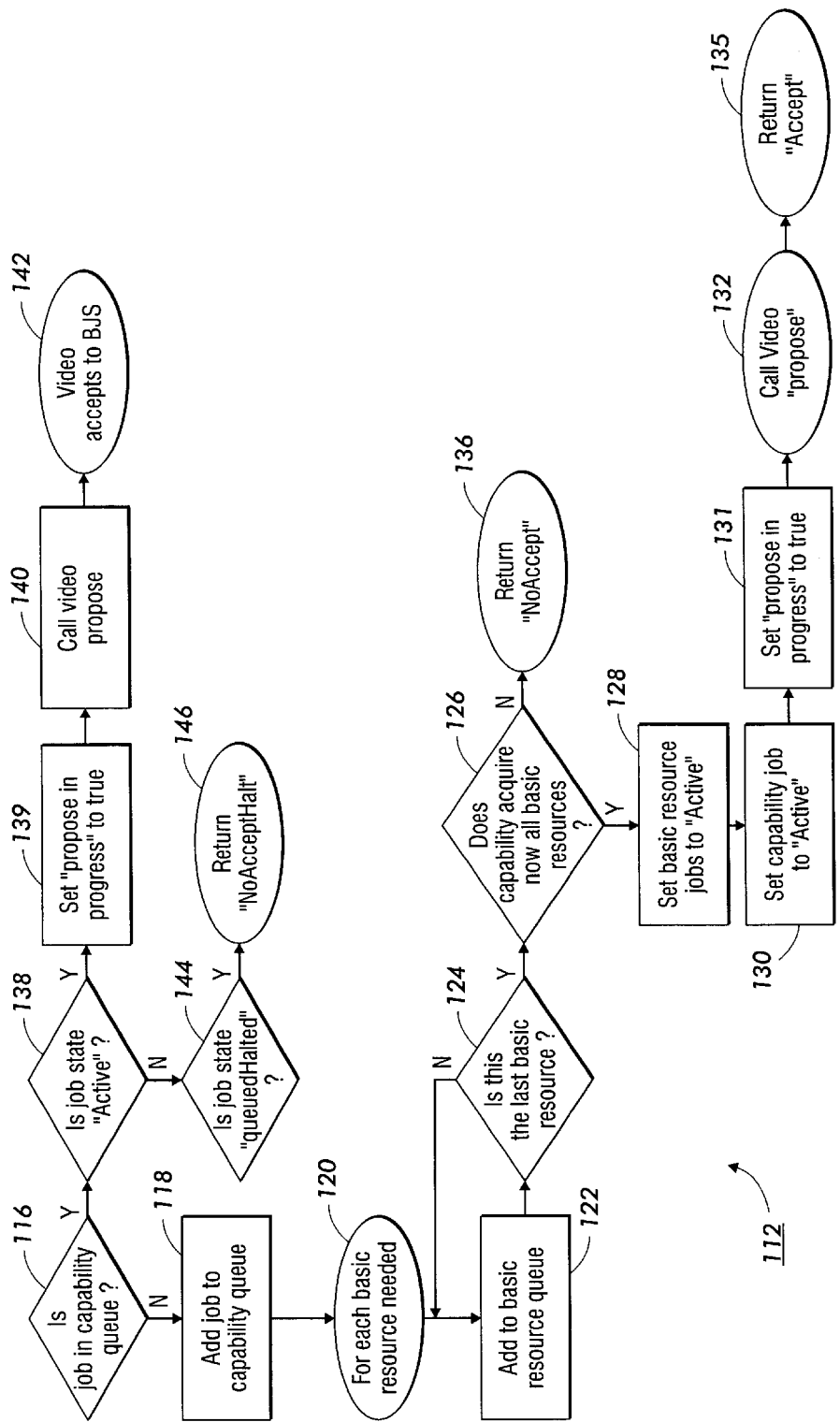
FIGS. 9, 10 and 11 comprise a schematic flow diagram depicting the manner in which jobs progress in a FIFO priority approach as a function of a preferred aspect of a contention management scheme embodied in the present invention.

Referring now to FIG. 9 a simplified FIFO only version of a Job Contention Manager (JCM) 112 for managing contention for a system's resources among multiple sub-jobs is described. On the first request from a BJS 110 for a sub-job, the element 116 determines that the sub-job is not in a capability job service queue in the database 114 and signals element 118 to that effect. The JCM 112 then creates a Capability Job Resource (CJR) containing the above data. Element 118 adds the CJR to the CR's job list or queue in the database 114. The JCM 112 then walks or scans through the list of basic resources (the capability to basic resources mapping is determined by reading a table defining these mappings, see Table 2a and 2b), required for the CR, for each basic resource the CR needs. This is accomplished by cycling through elements 120, 122 and 124. The capability to basic resources mapping is determined by reading a table defining these mappings. For each basic resource the CR needs as determined by element 120 a Basic Job Resource (BJR) is created and added to each basic resource's job list or queue in database 115 by element 122.

For a specific sub-job request, the set of data common to the Capability Job Resource (CJR) and Basic Job Resource (BJR) is termed a job resource. A resource's job list is the list or queue of requesting sub-jobs needing the capability or basic resource. When a BJR is added to a basic resource's queue, the BJR is placed in a position based on job priority. The top of the queue is the highest priority job with each subsequent job having a decreasing priority. The priority of the sub-job may be preferably determined as in the Salgado Application, namely FIFO or job based priority or a combination thereof, however, it may be determined in accordance with any desired conventional prioritizing approach. For this exemplary embodiment it is FIFO based.

For each added BJR, the JCM 112 determines the state of the Basic Job Resource. If the BJR is the highest priority job within the basic resource's job list (top of the queue), the state is "bjsActive" if no other "bjsActive" BJR is in the list. If there is another "bjsActive" BJR, then the added Basic Job Resource's state is "bjsAcquiring". If the added Basic Job Resource is not at the top of the queue, then the state is "bjsQueued".

In accordance with this invention the JCM 112 tracks current active use of resources on an image basis. This allows the transition or re-allocation the resources to another job when the resources are not being actively used. Only when the resources are being actively used by another sub-job does a higher priority job have to wait for the resources to be re-allocated.

The primary advantage of this invention is that it reduces the amount of time it takes to re-allocate resources from a lower priority sub-job to a higher priority sub-job. For example, the scanCompresse and essInputResConversion (transfer of print images from the ESS to SCS (digital copier) capabilities use the compressor basic resource.

Using the approach of the Salgado 66 Application, if the JCM 112 needs to transfer resources from an essinput sub-job to a scan sub-job, the time may be extremely large. For example it can take up to 15 minutes, before the Essinput Service proposes for its next image, so that the re-allocation can occur, since the ESS must fully decompose the image first. In accordance with this invention, the transition of resources is quicker since it will occur when the current ESS image is completed.

In accordance with this invention, the JCM 112 needs to determine the overall state of the CJR and the state of the "Propose" request. If all its component BJR's are "bjsActive" as determined by element 126 then element 128 sets all BJR's states to "bjsActive". Element 130 then sets the CJR's state to "cjsActive". Element 131 then sets the state of the "Propose" to "propose in progress" "true" which means the basic resource is actively processing the sub-job. The JCM 112 at 132 then forwards the BJS Propose to the component basic services (Video 111) for processing. Video 111 processes the request as normal and sends an Accept 135 to the BJS via the JCM.

Figure 15:
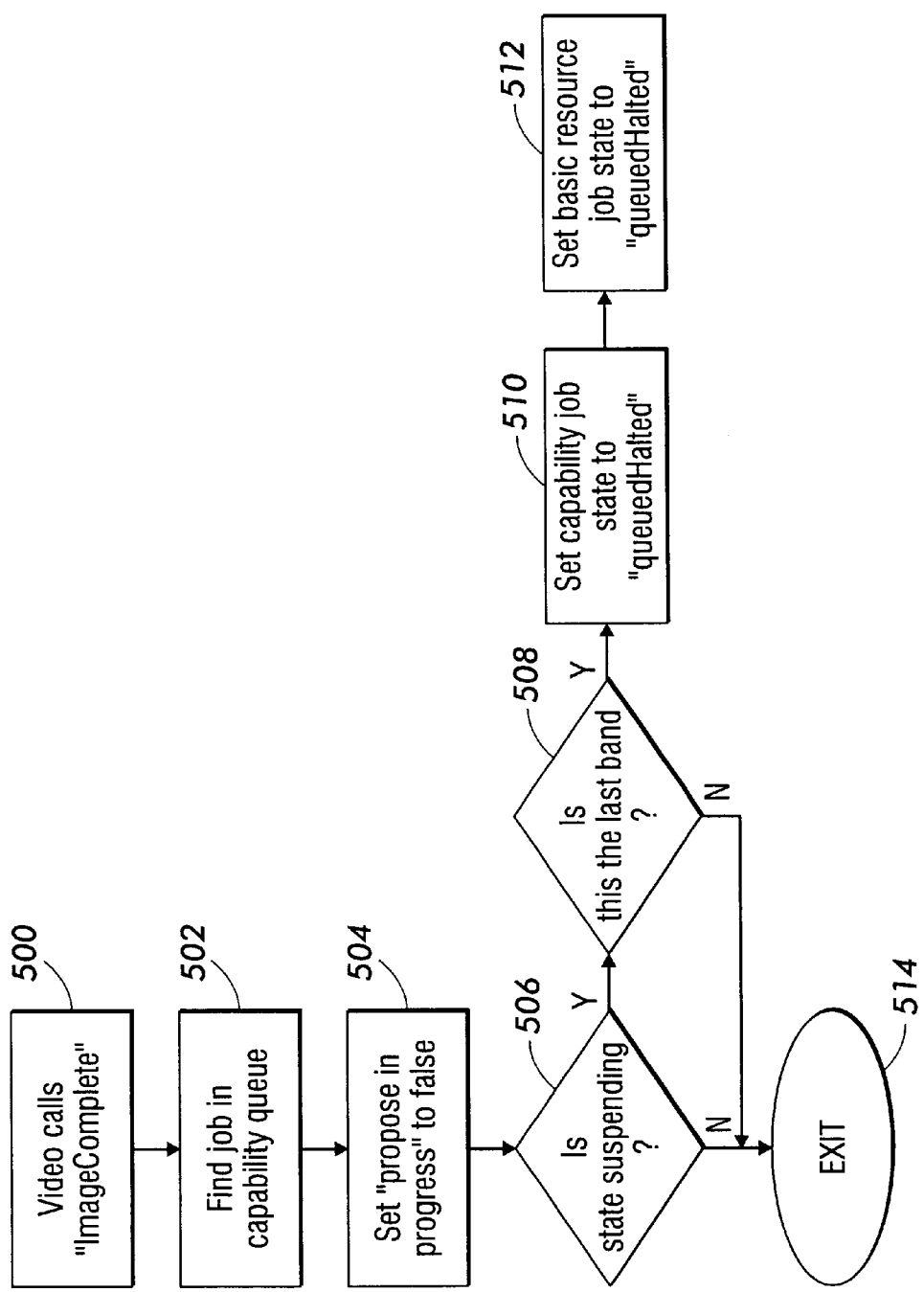
FIG. 15 comprises a schematic flow diagram depicting the manner in which jobs progress when video calls an image complete.

Referring now to FIG. 15 when Video 111 has completed an image for a given sub-job, it calls an "Image Complete" at element 500. Element 502 then finds the given sub-job, which was just processed in its respective CR queue. The state of the "Propose" is set to "propose in progress" "false" at element 504, which means the basic resource is not actively processing the given sub-job of the respective "Propose". Element 506 then determines if the sub-job's state is "suspending". If it was, then element 508 determines if the sub-job was for the last band in the image. If it was, then the sub-job's CJR's state is set to "queuedHalted" by element 510 and the component BJR's are set to "queuedHalted" by element 512. If the "Propose" was for other than the last band of the image then element 508 signals element 514 to exit. If element 506 finds that the given sub-job's state is not "suspending" then it signals element 508 to exit.

If the BJS' component BJRs have a combination of "bjsActive" and "bjsAcquiring" states, the CJR's state is "cjsAcquiring". Otherwise, the CJR's state is "cjsQueued". The JCM 112 then updates all of the CJR's respective BJRs to reflect the overall state. In other words, if the Capability Job Resource's (CJR's) state is "cjsQueued", all component Basic Job Resource's (BJR's) states are set to "bjsQueued". If the element 126 determines that the CJR has not acquired all the BJR's it needs since its state is "cjsAcquiring" or cjsQueued" then element 136 of the JCM 112 sends a "NoAccept" to the BJS 110. In this case, the BJS 110 has not acquired all the video (basic) resources necessary for sub-job processing. The BJS 110 then proposes again at a future time based on an internal timer (not shown).

Once, the BJS 110 "Proposes" for a sub-job, the JCM 112 tracks the BJS' sub-job request using its corresponding capability and Basic Job Resources (CJRs and BJRs) in the databases 114 and 115. For all subsequent Proposes from the BJS 110 for this sub-job, the JCM 112 uses the corresponding CJR's state to determine acceptance (Accept) or rejection (NoAccept). In this case the JCM 112 determines at element 116 that the sub-job is already in a queue (capability job list). If the sub-job is in the capability queue the JCM 112 then determines at element 138 if the capability's job state is "cjsActive". If it is, then element 139 sets the state of the "Propose" to "propose in progress" "true" Then the JCM 112 at element 140 forwards the BJS Propose to the component basic services (Video 111) for active processing. Video 111 processes the request as normal and sends an Accept to the BJS 110 via the JCM 112. After processing the image, Video 111 follows the steps as outlined above with respect to FIG. 15 and issues an "Image Complete" and sets the state of the Propose to "propose in progress" "false".

If the job state of the sub-job is not "cjsActive" as determined by element 138 then the JCM 112 determines at element 144 if it is "cjsAcquiring" or "cjsQueued". If it is "cjsAcquiring" or "cjsQueued" then the JCM 112 element 146 returns a "NoAccept" to the BJS 110, which proposes again at a future time based on an internal timer (not shown).

Figure 10:
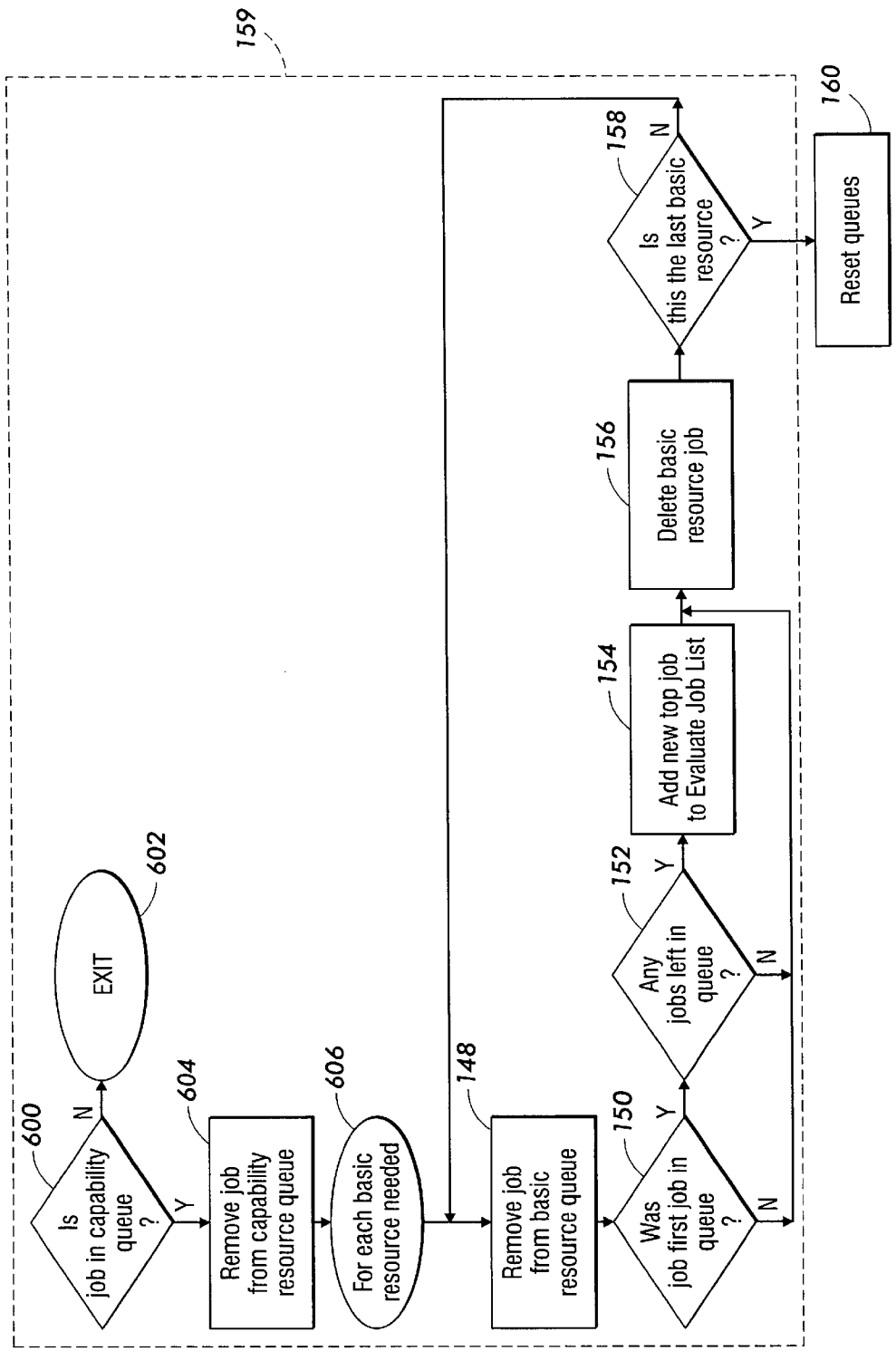
Figure 11:
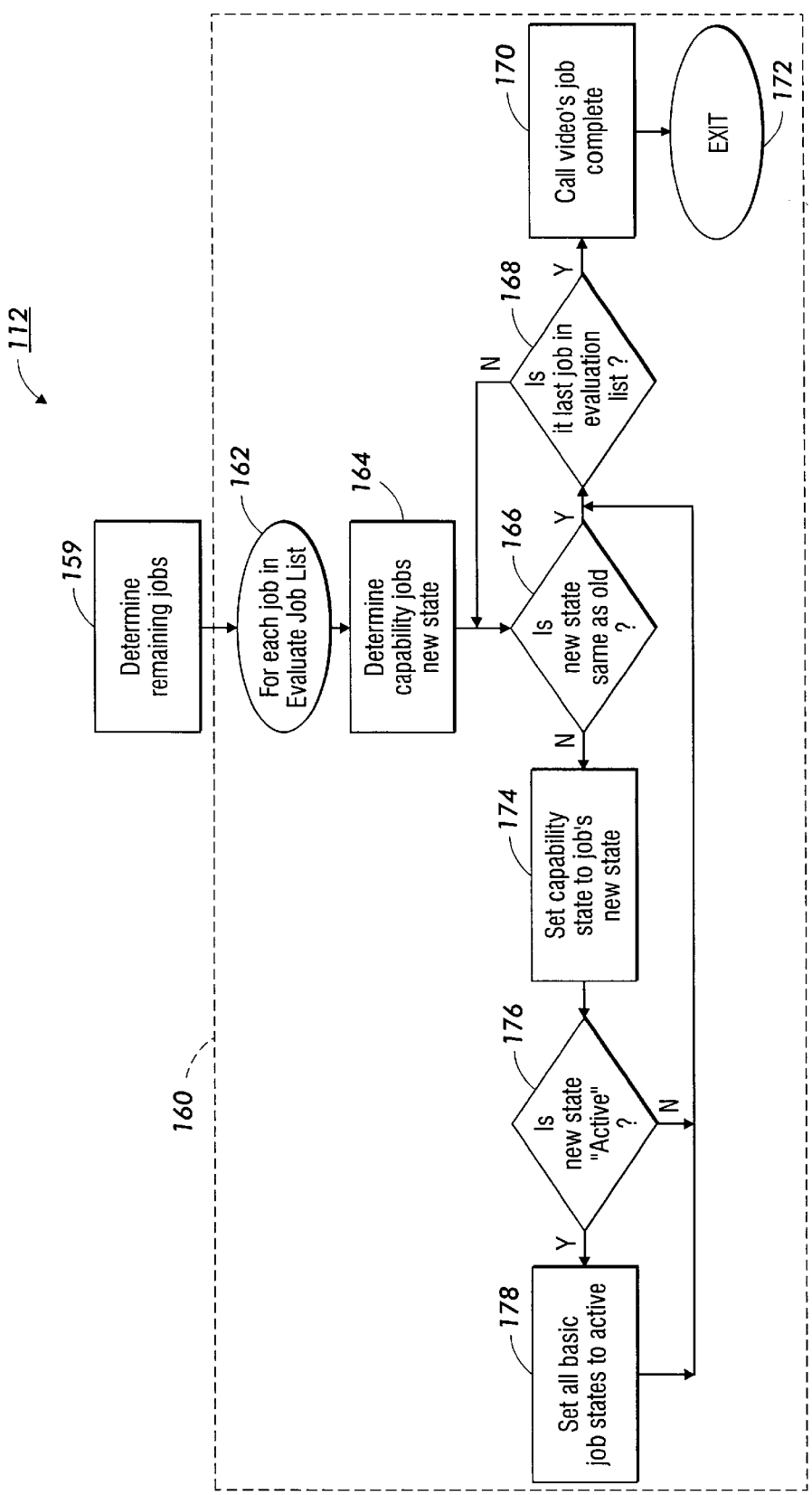

Referring now to FIGS. 10 and 11 the portion of the Job Contention Manager 112 associated with deleting a sub-job is shown. If the operator of the Multi Function Printer wishes to delete a job, he or she enter the delete or abort command at the External Job Service. The abort signal is fed to element 600 of the JCM 112 to determine if job is in a capability queue of the database 114. If it is not then element 602 causes the inquiry to terminate by exiting the JCM 112.

On the other hand if the aborting job is in the CR job queue then element 604 removes it from the Capability Resource job queue in the database 114. Element 606 then searches for each Basic Job Resource which was needed by the aborting CJR. The JCM 112 then walks through each such BR and removes the aborting sub-job from each respective BR job queue. This is accomplished by elements 148 through 158 of the JCM 112. Element 148 removes the aborting sub-job from each succeeding BR job queue. Upon removing a sub-job from a BR job queue it signals element 150 which decides if the deleted job is the top job in the respective BR job queue. If it was at the top of the queue then element 152 determines if there are any sub-jobs left in the respective queue. If there are sub-jobs remaining, then element 154 moves the next sub-job to the top of the queue. Element 154 then signals element 156 to delete the aborting sub-job from the BR job queue. If the aborting BR sub-job was not first in the queue then element 150 signals element 156 to delete the sub-job from BR job queue. If the aborting BR sub-job was first in the queue but there are no other jobs left in the queue then element 152 signals element 156 to delete the sub-job from the BR job queue. After the last BR sub-job for the aborting BJS sub-job is removed from the BR job queue of the database 115 a signal is sent by element 158 to the reset queues portion 160 of the JCM 112.

Referring to FIG. 11 the reset queues portion 160 of the JCM 112 is shown in greater detail. When the last basic resource of the aborting sub-job is deleted from the respective BR job queues then element 158 of the portion 159 of the JCM 112 which determines remaining jobs after a job is aborted, signals element 162 which identifies each sub-job in the CR job queue in database 114. Element 164 then determines the state of each of the sub-jobs in the CR job queue and signals element 166 which then determines if the new state is the same as the old. If it is, then element 168 determines if the sub-job is the last job in the CR job queue. If it is not the last job, then the JCM 112 walks through all the remaining sub-jobs in the CR job queue by sending a signal from element 168 back to element 166 to repeat the cycle. If it is the last job in the CR job queue then element 168 signals element 170 to call a "SubJobComplete" and exit at 172.

If element 166 determines that the new state is not the same as the old state then it signals element 174 which sets the CJR's state to the new state. Element 174 signals element 176 which determines if the new state is "bjsActive". If the new state is "bjsActive then element 178 sets all corresponding BJR states to "bjsActive". If element 178 sets all BJR states to "bjsActive" then it signals element 168 which determines if the sub-job is the last job in the CR job queue. If it is, element 170 is signaled to call "SubJobComplete" and exit at 172. If element 176 determines that the new state is not "bjsActive" then it signals element 168 which will recycle it since it is not the last item in the queue.

Figure 12:
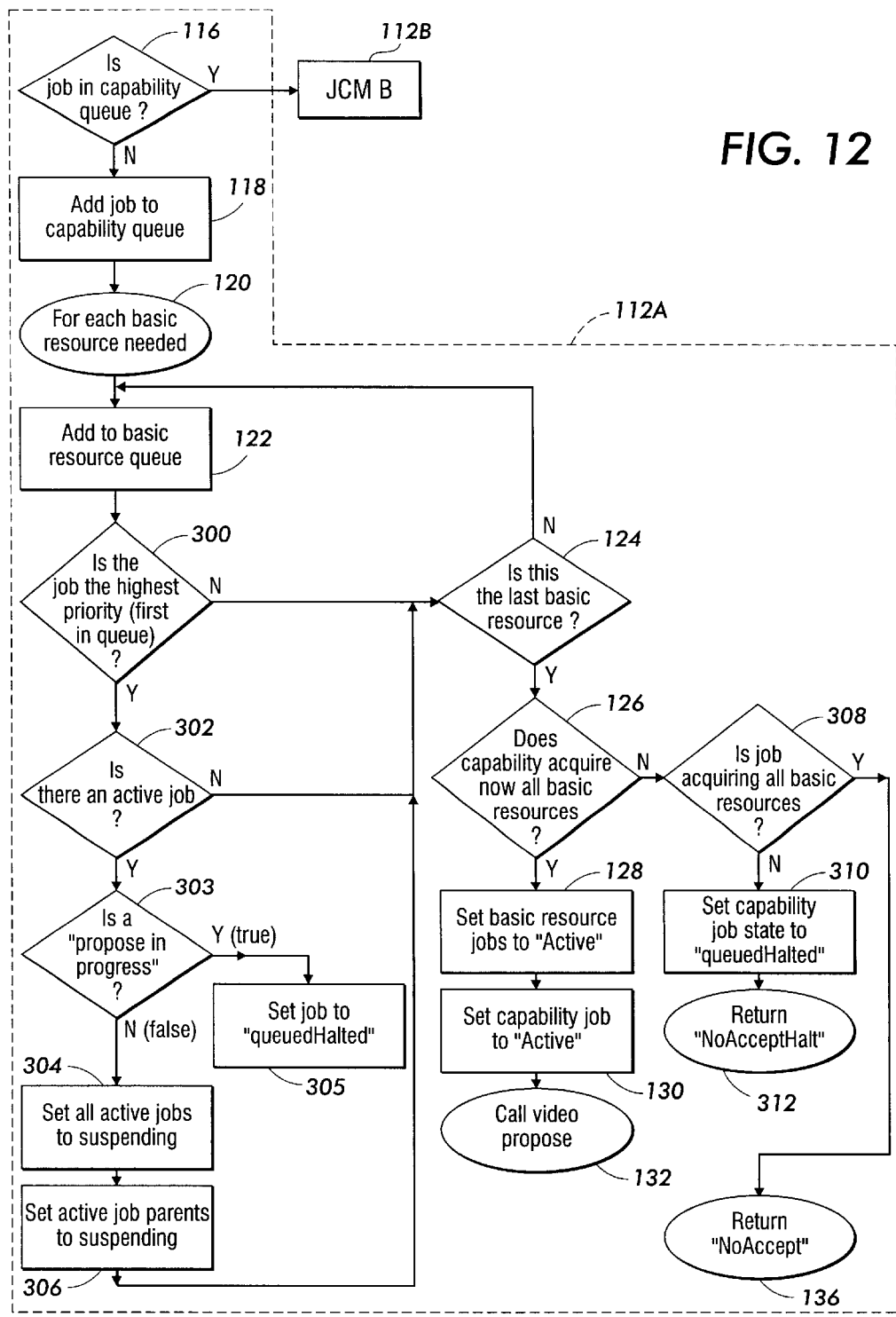
FIGS. 12, 13, and 14 comprise a schematic flow diagram depicting the manner in which jobs progress in a job based priority approach as a function of another preferred aspect of a contention management scheme embodied in the present invention.
Figure 13:
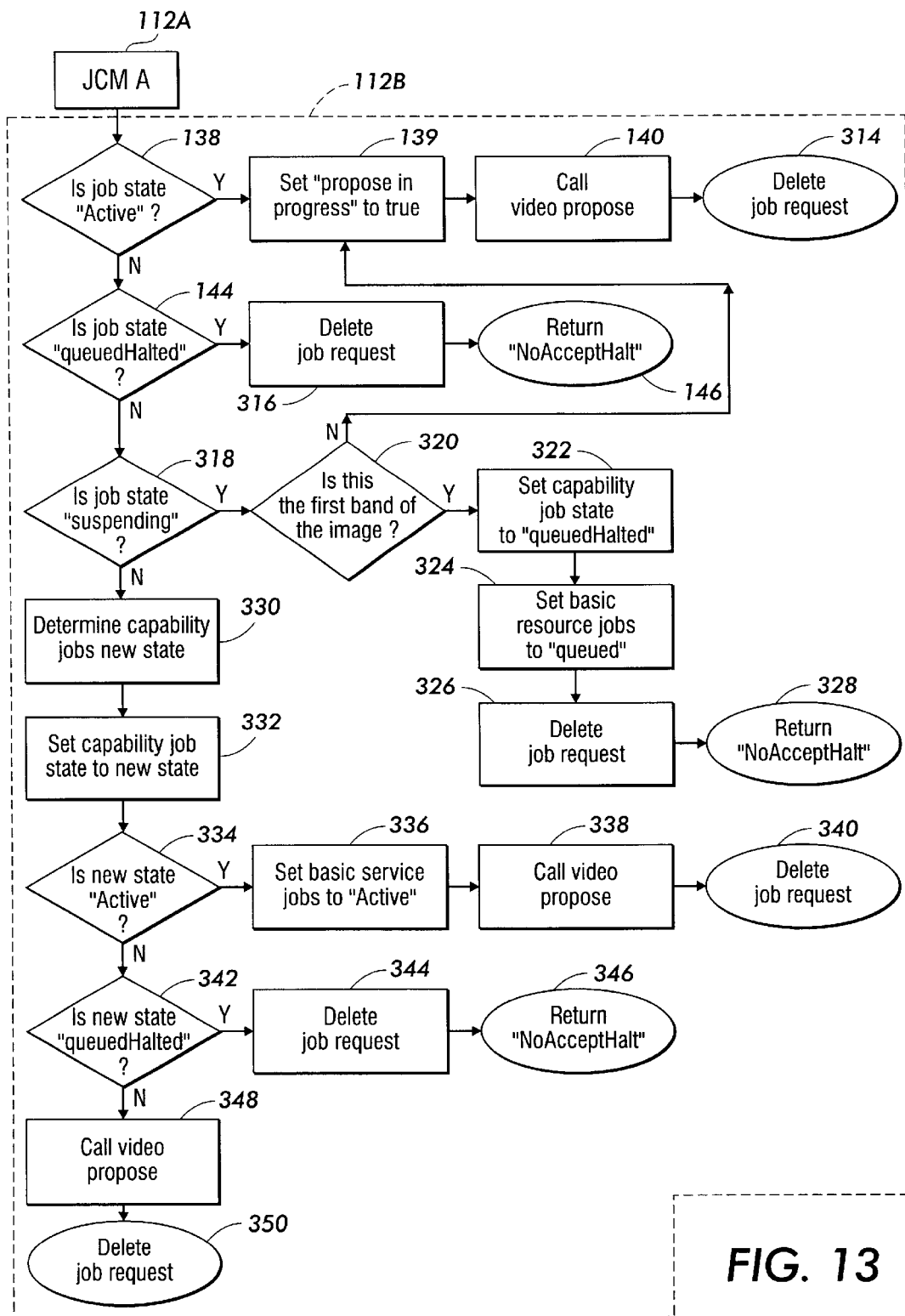

Referring now to FIGS. 12, 13 and 15 the architecture of a preferred embodiment of the process and apparatus of this invention, for managing contention for a system's resources among multiple sub-jobs, using FIFO and/or job based priority will now be described in detail. In this preferred embodiment of the invention, access to resources is managed with a "Key Operator/System Administrator ("KO/SA") defined algorithm similar to that described in the Salgado Application. With this algorithm, the KO/SA can arrange to have jobs defined according to job type, immediate walkup need, history of interruptions and other relevant factors. The algorithm can be configured to manage job contention in accordance with the desires of a typical printing system user. Since it is flexibly programmable, the algorithm can be made to accommodate for FIFO. In other words, FIFO is a subset of the capabilities of this algorithm. This invention prioritizes at the level of the basic resources thereby providing more efficient use of those resources.

Figure 14A:
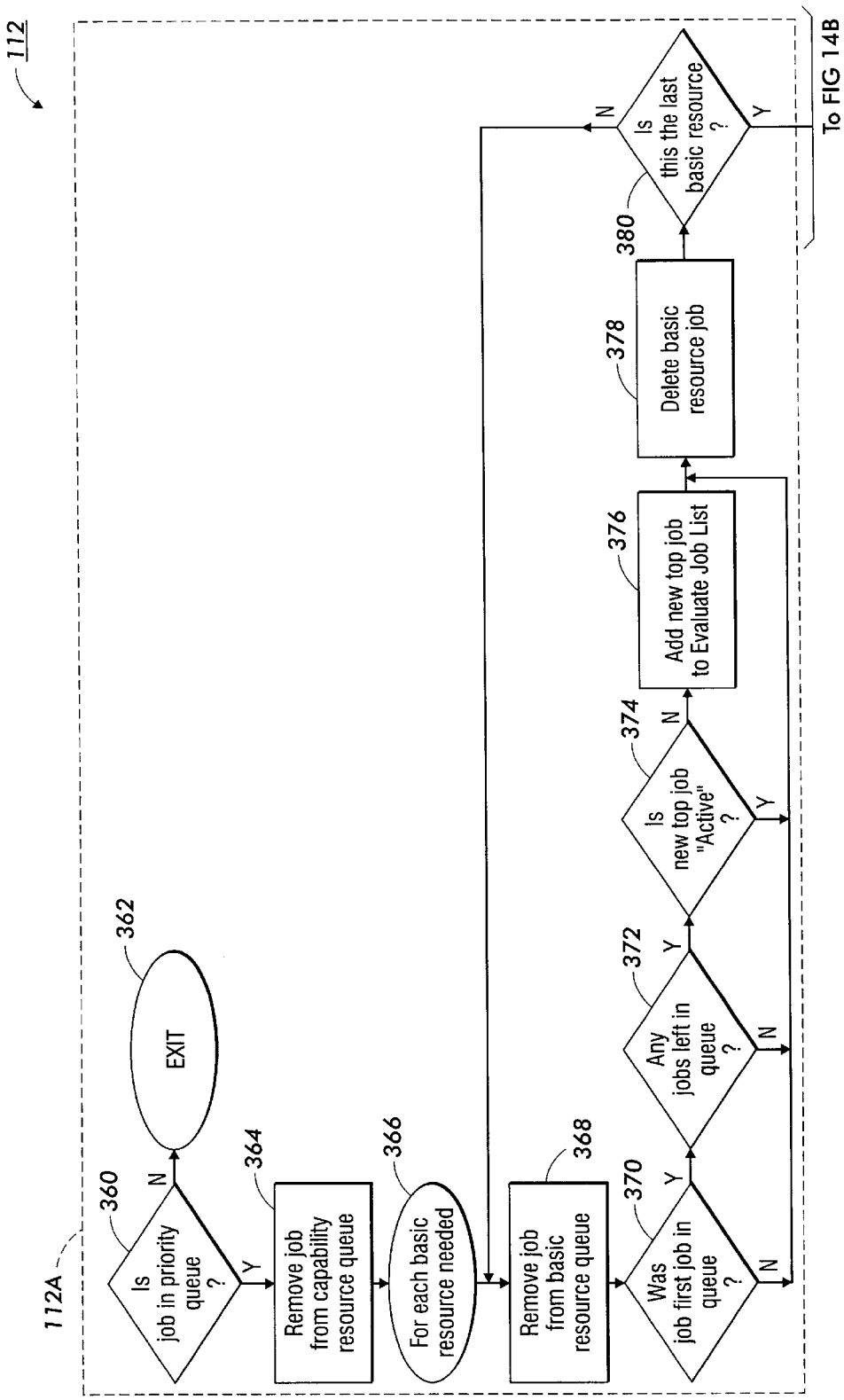
Figure 14B:
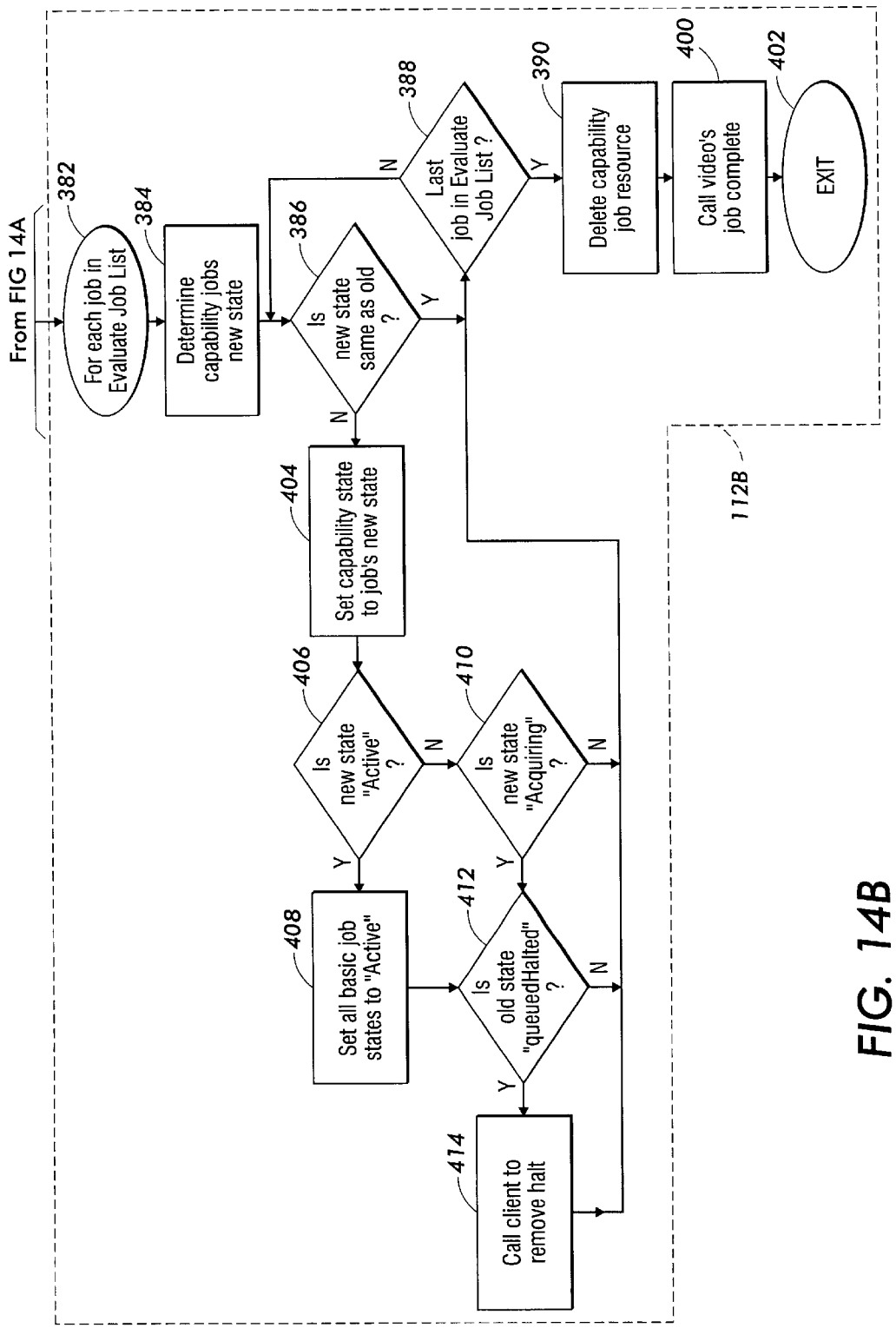

In FIGS. 12, 13 and 14 many common elements from the previously disclosed embodiment of FIGS. 9, 10 and 11 have been given corresponding reference numbers and have the same function as described heretofore. FIG. 12 shows the portion of the JCM 112A which deals with sub-jobs which are "Proposed" but are not already in the CR job queue.

Once again when a Basic Job Service 110 is ready to process a sub-job, the BJS 110 calls or signals the JCM 112A with an image "Propose" request as in FIG. 8 for each image it needs to process. The "Propose" request includes the job identifier, its priority information, the video capability required, and the requesting BJS identification. For example, the Scan BJS needs to scan a copy job (id: 3-1) form the DADH (document handler). For each image the scanner needs to input, the Scan BJS 110 calls the JCM 112 with a "Propose" (e.g. BJS service: Scan, job: 3-1, job priority: XXX, capability: ScanCompressed, ...)

Referring now to FIGS. 12 and 13 a job based priority version of a Job Contention Manager (JCM) 112 for managing contention for a system's resources among multiple sub-jobs is described. On the first request from a BJS 110 for a sub-job, the element 116 determines that the sub-job is not in a capability job service queue in the database 114 and signals element 118 to that effect. The JCM 112A then creates a Capability Job Resource (CJR) containing the above data. Element 118 adds the CJR to the CR's job list or queue in the database 114. The JCM 112A then walks or scans through the list of basic resources (see Table 2a and 2b), required for the CR, for each basic resource the CR needs. This is accomplished by cycling through elements 120, 122 124 and 300. For each basic resource the CR needs as determined by element 120 a Basic Job Resource (BJR) is created by element 122 and added to each basic resource's job list or queue in database 115.

New element 300 then determines if the sub-job is first in the queue of the BR, namely, the highest priority job. If it is not, it signals element 124. If element 300 determines that the relevant sub-job is first in the queue it signals element 302 which determines if there is a "bjsActive" job in the respective queue. If there is not such a "bjsActive" job then element 302 signals element 124. If element 302 determines that there is a "bjsActive" job in the respective queue then it signals element 303 determines whether the state of the sub-job's Propose is "propose in progress" "true" or "propose in progress" "false". If the state of the "propose in progress" at element 303 is "true" then there is an actively processing different sub-job in the queue and element 305 sets the newly proposed sub-job state to "queuedHalted". If the state of the "propose in progress" at element 303 is false then element 303 signals element 304 to set all "bjsActive" jobs to "bjsSuspending" and notifies element 306 to set the CJR parent of the suspending BJR to "bjsSuspending". Element 306 then signals element 124. If the last component BJR has been added then element 124 signals element 126 which determines if the CJR has acquired all the BJR's it needs to carry out the sub-job.

Elements 300–306 serve to allow a higher priority job (as determined by the SA/KO algorithm) to suspend an active job until the higher priority job is completed. When a new sub-job request results in the need to suspend another sub-job's request, the JCM 112A sets the existing sub-job's CJR's state to "cjsSuspending". Upon the next Propose for the suspending sub-job, the JCM transitions the basic resources from the suspending sub-job to the acquiring sub-job. The BJS that Proposed for the suspending sub-job receives a "NoAccept" from the JCM 112A. When a BJS has completed its processing of a sub-job, it notifies the JCM 112 via a "SubJobCompleted". On receiving a "SubJobCompleted", the JCM 112 deletes the sub-job's information (CJRs and BJRs). For each BJR component used by the sub-job, the JCM 112 assigns the basic resource to the next sub-job in the BR's job queue (the state initially goes to "bjsActive"). The JCM 112 then recalculates the state of these BJR's parent CJRs. If the BJS has Proposed for resources, the BJS also calls "SubJobCompleted" when the job is deleted by the user or terminated by the system.

At this point, the JCM 112A needs to determine the overall state of the BJS' "Propose" request (in this invention, it is the state of the CJR). If all its component BJR's are "bjsActive" as determined by element 126 then element 128 sets all BJR's states to "bjsActive". Element 130 then sets the CJR's state to "cjsActive". The JCM 112A at 132 then forwards the BJS Propose to the component basic services (Video 111) for processing. Video 111 processes the request as normal and sends an Accept to the BJS via the JCM. After processing the image, Video 111 follows the steps as outlined above with respect to FIG. 15 and issues an "Image Complete" and sets the state of the Propose to "propose in progress" "false".

As noted above for each added BJR, the JCM 112 determines the state of the Basic Job Resource. If the BJR is the highest priority job within the basic resource's job list (top of the queue), the state is "bjsActive" if no other "bjsActive" BJR is in the list. If there is another "bjsActive" BJR, then the added Basic Job Resource's state is "bjsAcquiring". If the added Basic Job Resource is not at the top of the queue, then the state is "bjsQueued". If the BJS' component BJRs have a combination of "bjsActive" and "bjsAcquiring" states, the CJR's state is "cjsAcquiring". Otherwise, the CJR's state is "cjsQueued". The JCM 112 then updates all of the CJR's respective BJRs to reflect the overall state. In other words, if the Capability Job Resource's (CJR's) state is "cjsQueued", all component Basic Job Resource's (BJR's) states are set to "bjsQueued".

If the element 126 determines that the CJR has not acquired all the BJR's it needs since its state is "cjsAcquiring" or cjsQueued" then it notifies element 308 which determines if the sub-job is acquiring all the basic resources it needs. If it determines that the CJR is not acquiring all the BJR's it needs then element 310 sets the CJR to "bjs- Queued" and the JCM 112A returns a "NoAccept" to the proposing BJS. If element 308 determines that the CJR's state is "bjsAcquiring" it signals element 136 to return a "NoAccept" to the BJS. As in the previous embodiment the BJS after receiving a "No Accept" will propose again at a later time based on a timing signal.

If element 116 of FIG. 12 determines that the sub-job is already in the CR queue then part A of the JCM 112 signals element 138 in part B of JCM 112 (shown in FIG. 13), which determines if the job state of the CJR is "cjsActive". If it is, it notifies element 139 as described above, which sets the state of the sub-job's Propose to "propose in progress" "true". Element 139 then notifies element 140 and the JCM 112B then forwards the BJS Propose to the component basic services (Video 111) for processing. Video 111 processes the request as normal and sends an Accept to the BJS via the JCM. After processing the image, Video 111 follows the steps as outlined above with respect to FIG. 15 and issues an "Image Complete" and sets the state of the Propose to "propose in progress" "false". The BJS sends a SubJobComplete to the JCM which deletes the sub-job from the BR and CR job queues at 314. On the other hand if element 138 determines that the job state of the CJR is not active then it signals element 144 which determines if the sub-job state is "cjsQueuedHalted". If it is, then element 144 signals element 316 to delete the sub-job request and element 146 returns a "NoAcceptHalt".

If element 144 determines that the job state is not "cjsQueuedHalted" it signals element 318 which determines if the job state is "cjsSuspending". If it is, it signals element 320 which determines if it is the first band of the image. If it is not the first band of the image then element 320 signals element 140 and the JCM 112B then forwards the BJS Propose to the component basic services (Video 111) for processing. Video 111 processes the request as normal and sends an Accept to the BJS via the JCM. After processing the image, Video 111 follows the steps as outlined above with respect to FIG. 15 and issues an "Image Complete" and sets the state of the Propose to "propose in progress" "false". The BJS sends a "SubJobComplete" to the JCM, which deletes the sub-job from the BR and CR job queues at 314. On the other hand if element 138 determines that the job state of the CJR is not "cjsActive" then it signals element 144 which determines if the sub-job state is "cjsQueued".

If element 320 determines that the sub-job is the first band of the image then it signals element 322 to set the CJR state to "cjsQueuedHalted" which in turn causes element 324 to set the component BJR's to "bjsQueued". Element 326 then deletes the job request and the JCM returns a "NoAcceptHalt" at 328 to the BJS.

If element 318 determines that the sub-job is not suspending it notifies element 330 which determines the CJR's new state. Element 332 then sets the CJR to the new state which is forwarded to element 334 which determines if the new state is "cjsActive". If it is, then element 336 sets the component BJR's to "bjsActive". The JCM 112B at 338 then forwards the BJS' Propose to the component basic services (Video 111) for processing. Video 111 processes the request as normal and sends an Accept to the BJS 110 via the JCM. After processing the image, Video 111 follows the steps as outlined above with respect to FIG. 15 and issues an "Image Complete" and sets the state of the Propose to "propose in progress" "false". Upon completion of the sub-job the BJS 110 signals the JCM, "SubJobComplete" and element 340 deletes the job request from the CR and BR job queues.

If element 334 determines that the new state is not "cjsActive" it notifies element 342 which determines if the new state is "cjsQueuedHalted". If it is, then element 344 deletes the job request and the JCM 112B returns a "NoAcceptHalt" to the BJS 110 at element 346. If the new state is not "cjsQueuedHalted" then element 342 notifies element 348 which then forwards the BJS' "Propose" to the component basic services (Video 111) for processing. Video 111 processes the request as normal and sends an Accept to the BJS 110 via the JCM 112. After processing the image, Video 111 follows the steps as outlined above with respect to FIG. 15 and issues an "Image Complete" and sets the state of the Propose to "propose in progress" "false". Upon completion of the sub-job the BJS 110 signals the JCM "SubJobComplete" and element 350 deletes the job request from the CR and BR job queues.

Referring now to FIG. 14 the portion of the Job Contention Manager 112 associated with deleting a sub-job in the job based priority alternative is shown. If the operator of the Multi-Function Printer wishes to delete a job, he or she enters the delete or abort command at the External Job Service. The abort signal is fed to element 360 of the JCM 112 to determine if the job is in a CR job queue of the database 114. If it is not, then element 362 causes the inquiry to terminate by exiting the JCM 112.

On the other hand if the aborting job is in the CR job queue then element 364 removes it from the Capability Resource queue in the database 114. Element 366 then searches for each Basic Job Resource which was needed by the aborting CJR. The JCM 112 then walks through each such BJR and removes the aborting sub-job from each respective BR job queue. This is accomplished by elements 368 through 380 of the JCM 112. Element 368 removes the aborting sub-job from each succeeding BR job queue. Upon removing a sub-job from a BR job queue it signals element 370 which decides if the deleted job is the top job in the respective BR job queue. If it was at the top of the queue, then element 372 determines if there are any sub-jobs left in the respective queue. If there are sub-jobs remaining, then element 374 determines if the new top job is "bjsActive". If it is not, then element 376 moves the next sub-job to the top of the queue. Element 376 then signals element 378 to delete the aborting sub-job from the BR job queue.

If the aborting BJR sub-job was not first in the queue, then element 370 signals element 378 to delete the sub-job from BR job queue. If the aborting BJR sub-job was first in the queue but there are no other jobs left in the queue, then element 372 signals element 378 to delete the sub-job from the BR job queue. If the aborting BJR sub-job was first in the queue and there are other sub-jobs left in the queue and element 374 determines that the new top sub-job is "bjsActive", then it signals element 378 to delete the aborting sub-job from the BR job queue.

After the last BJR sub-job for the aborting BJS sub-job is removed from the BR job queue of the database 115 a signal is sent by element 380 to the reset queues portion 112B of the JCM 112. When the last basic resource of the aborting sub-job is deleted from the respective BR job queues then element 380 of the portion 112A of the JCM 112 signals element 382 which identifies each sub-job remaining in the CR job queue in database 114. Element 384 then determines the state of each of the sub-jobs in the CR job queue and signals element 386, which then determines if the new state is the same as the old. If it is, then element 388 determines if the sub-job is the last job in the CR job queue. If it is not the last job, then the JCM 112 walks through all the remaining sub-jobs in the CR job queue by sending a signal from element 388 back to element 386 to repeat the cycle. If it is the last job in the CR job queue, then element 388 signals element 390 to delete the CJR. Element 400 then calls a "SubJobComplete" and exits the JCM at 402.

If element 386 determines that the new state is not the same as the old state then it signals element 404 which sets the CJR's state to the new state. Element 404 signals element 406 which determines if the new state is "cjsActive". If the new state is "cjsActive then element 408 sets all basic job states to "bjsActive". If the new state is not "cjsActive" then element 410 determines if the new state is "cjsAcquiring". If it is then element 412 determines if the old state of the CJR was "cjsQueuedHalted". If it was, then element 414 calls the client to remove the halt (i.e. Propose again). If element 408 sets all BJR states to "bjsActive" then it signals element 412 which determines if the old state was "bjsQueuedHalted". If it was, then element 414 calls the client to remove the halt (i.e. Propose again).

Element 414 or element 412 if the old state is not "cjsQueuedHalted" or element 410 if the new state is not "cjsAcquiring" signal element 388 which determines if the sub-job is the last job in the CR job queue. If it is not the last job, then the JCM 112 walks through all the remaining sub-jobs in the CR job queue by sending a signal from element 388 back to element 386 to repeat the cycle. If it is the last job in the CR job queue then element 388 signals element 390 to delete the CJR. Element 400 then calls a "SubJobComplete" and then exits the JCM at 402.

With this invention, the JCM 112 maintains a "Propose" state which is set by various elements such as elements 131,139 and 504. When a BJS proposes for the sub-job and the JCM 112 forwards the Propose to video 111, the JCM 112 sets the sub-job's Propose state to "propose in progress" or "propose in progress" "true" or active or actively processing, which terms are used herein interchangeably. When video 111 completes the processing of the Propose, it sends the JCM 112 an Image Complete notification at element 500. On this notification, the JCM 112 sets the sub-job's Propose state to "propose in progress" "false" or not active or not actively processing, which terms are used herein interchangeably.

With this invention two resource transition points exist. When a BJS Proposes to the JCM 112 for a higher priority sub-job, resource transition occurs substantially immediately if another sub-job is not actively using the resources. If another sub-job is actively using the resources, the transition occurs when Video 111 notifies the JCM 112 with the Image Complete for that sub-job's Propose.

The method and apparatus for prioritizing the use of a Multi-Functional Printer may employ any desired number of capabilities. Those set forth above are only by way of example. The following table illustrates by way of a further example a wider range of capabilities than heretofore described which could be employed, however, additional capabilities as desired could also be employed.

TABLE 3

Capabilities

| CAPABILITY RESOURCES | BASIC JOB RESOURCES | | | | | |
|---|---|---|---|---|---|---|
| EssBandRes-Conversion | compressor | Loopback channel | IPS1 | | | |
| EssBandNoRes-Conversion | compressor | Loopback channel | | | | |
| EssBand-BusGate | compressor | Loopback channel | | | | |
| IIInternalImage-FirstOriginal | Input channel | IPS1 | | | | |
| IIInternlImage | Input channel | IPS1 | | | | |
| IInullImage | Input channel | IPS1 | | | | |
| IPBlankImage | compressor | decompressor | Input channel | Output channel | Loopback channel | |
| IPCompression | compressor | decompressor | Input channel | Output channel | Loopback channel | |
| IPDecompression | compressor | decompressor | Input channel | Output channel | Loopback channel | |
| IPImageRepeat | compressor | decompressor | Input channel | Output channel | Loopback channel | |
| IPNUpImage | compressor | decompressor | Input channel | Output channel | Loopback channel | |
| IPRotation | compressor | decompressor | Input channel | Output channel | Loopback channel | |
| IPCreateText | compressor | decompressor | Input channel | Output channel | Loopback channel | |
| IPDiskText | compressor | decompressor | Input channel | Output channel | Loopback channel | |
| IPAnnotation | compressor | decompressor | Input channel | Output channel | Loopback channel | |
| PGOriginal | decompressor | Output channel | | | | |
| ScanOriginal | compressor | Input channel | IPSI | | | |
| PreScan | | | IPSl | | | |
| ScanToFile | Output channel | | | | | |
| MarkOutput | decompressor | Output channel | | | | |

The method and apparatus for prioritizing the use of a Multi-Functional Printer of this invention provides a significant improvement over the prior art approaches by extending the queuing process down to the level of the basic resources for carrying out the sub-job. This allows basic resources to be reallocated to other sub-jobs as soon as the basic resource is available rather than having to wait for a basic job service to complete its operation as in previous machines. For an MFP with shared basic resources this provides better thruput since the basic shared video resources of the printer can carry out multiple sub-jobs when there is no contention at the level of the basic resources.

In order to better illustrate the improved performance of the present invention the following example is provided. The contention algorithm is "priority based". In this example, copy jobs have a priority 8 and testPatternPrint jobs have a priority 5. Thus, copy jobs are higher priority than testPatternPrint jobs. Note: jobs can begin outputting after 4 images have inputted.

First a user selects to print a test pattern print job. A test pattern print job TJ1 is entered at the EJS, having a priority of 5. The External Job Service divides the Test Pattern Print Job 1 into Internal Image Gen and Mark sub-jobs. The Internal Image Gen Service requires the IIInternalImage capability that uses the IPS1 and Input Channel basic resources. The Mark Service requires the "MarkOutput" capability that uses the Output Channel and Decompressor basic resources. The BJS 110 sends the JCM 112 a "Propose" for the internal image gen sub-job TJ1 for the capa bility "IIInternalImage". The JCM 112 enters the TJ1 sub-job in the IIInternalImage CR job queue.

| CAPABILITY RESOURCE | SCANORIGINAL | IIINTERNALIMAGE |
|---|---|---|
| QUEUE POSITION 1 | | Job: TJ1 Service: internal image gen Propose State: not active |
| QUEUE POSITION 2 | | |
| QUEUE POSITION 3 | | |

The JCM 112 then enters the TJ1 sub-job in the BR IPS1 and Input Channel. Because the capability sub-job acquires its resources, its state is active and propose state is "in progress".

| BASIC JOB RESOURCE | COMPRESSOR | INPUT CHANNEL | IPS1 |
|---|---|---|---|
| QUEUE POSITION 1 | | Job: TJ1 Service: internal image gen Capability: IIInternalImage State: active | Job: TJ1 Service: internal image gen Capability: IIInternalImage State: active |
| QUEUE POSITION 2 | | | |
| QUEUE POSITION 3 | | | |

| CAPABILITY RESOURCE | SCANORIGINAL | IIINTERNALIMAGE |
|---|---|---|
| QUEUE POSITION 1 | | Job: TJ1 Service: internal image gen Propose State: in progress |
| QUEUE POSITION 2 | | |
| QUEUE POSITION 3 | | |

When video completes processing this Propose, it notifies the JCM using ImageComplete. The JCM sets the IIInternalImage propose state to "not active".

| CAPABILITY RESOURCE | SCANORIGINAL | IIINTERNALIMAGE |
|---|---|---|
| QUEUE POSITION 1 | | Job: TJ1 Service: internal image gen Propose State: not active |
| QUEUE POSITION 2 | | |
| QUEUE POSITION 3 | | |

A user comes to the device, places originals in the document handler, and runs a copy job.

Copy Job 1, having a priority 8, is entered at the EJS. The External Job Service divides the Copy Job 1 into Scan and Marking sub-jobs. The Scan Service requires the "ScanOriginal" capability that uses the Compressor, IPS1, and Input Channel basic resources. The Mark service requires the "MarkOutput" capability that uses the Output Channel and Decompressor basic resources. The BJS 110 sends the JCM 112 a "Propose" for the scan sub-job CJ1 for capability "ScanOriginal". The JCM 112 enters the CJ1 sub-job in the "ScanOriginal" CR job queue as the top job.

| CAPABILITY RESOURCE | SCANORIGINAL | IIINTERNALIMAGE |
|---|---|---|
| QUEUE POSITION 1 | Job: CJ1 Service: scan Propose State: not active | Job: TJ1 Service: internal image gen Propose State: not active |
| QUEUE POSITION 2 | | |
| QUEUE POSITION 3 | | |

The JCM 112 then enters the scan service's CJ1 sub-job in the Compressor, IPS1 and Input Channel BR job queues. Since a copy job is higher priority than a test pattern print job, the scanOriginal sub-job is placed ahead of the iiInternalImage sub-job.

| BASIC JOB RESOURCE | COMPRESSOR | INPUT CHANNEL | IPS1 |
|---|---|---|---|
| QUEUE POSITION 1 | Job: CJ1 Service: scan Capability: ScanOriginal State: TBD | Job: CJ1 Service: scan Capability: ScanOriginal State: TBD | Job: CJ1 Service: scan Capability; ScanOriginal State: TBD |
| QUEUE POSITION 2 | | Job: TJ1 Service: internal image gen Capability: IIInternalImage State: active | Job: TJ1 Service: internal image gen Capability: IIInternalImage State: active |
| QUEUE POSITION 3 | | | |

Since the IIInternalImage sub-job doesn't have a Propose in progress, resources can be immediately shifted to the scanOriginal sub-job. The iiInternalImage sub-job's basic resource states are set to queuedHalted. The scanOriginal sub-job's basic resource states are set to active. The scanOriginal sub-job's Propose is sent to the Video 111 service and its propose state is set to "in progress".

| BASIC JOB RESOURCE | COMPRESSOR | INPUT CHANNEL | IPS1 |
|---|---|---|---|
| QUEUE POSITION 1 | Job: CJ1 Service: scan Capability: ScanOriginal State: active | Job: CJ1 Service: scan Capability: ScanOriginal State: active | Job: CJ1 Service: scan Capability: ScanOriginal State: active |

-continued

| BASIC JOB RESOURCE | COMPRESSOR | INPUT CHANNEL | IPS1 |
|---|---|---|---|
| QUEUE POSITION 2 | | Job: TJ1<br>Service: internal image gen<br>Capability: IIInternalImage<br>State: queuedHalted | Job: TJ1<br>Service: internal image gen<br>Capability: IIInternalImage<br>State: queuedHalted |
| QUEUE POSITION 3 | | | |

| CAPABILITY RESOURCE | SCANORIGINAL | IIINTERNALIMAGE |
|---|---|---|
| QUEUE POSITION 1 | Job: CJ1<br>Service: scan progress | Job: TJ1<br>Service: internal Propose State: not active |
| QUEUE POSITION 2 | | |
| QUEUE POSITION 3 | | |

The terms Propose, Accept, NoAccept, NoAcceptHalt, SubJobComplete, Image Complete, as used herein generally refer to a signal or software request or software notification and the terms Active, Not Active, propose in progress (±true or false) Queued, queuedHalted, suspending, refer to states of a sub-job or a Propose. These terms are used in a generic sense and other terms could be used in their place, as desired, as a name for their function or purpose.

The term ESS as used herein refers to an electronic subsystem used for network connectivity and decomposition of images. The term SCS as used herein refers to the strategic control system which is the digital copier control platform. They are part of the electronic control system of the MFP.

The names used for capabilities in Table 3 are provided for convenience and any desired name could be used as the name of a capability. Generally the capabilities in Table 3 are just abbreviations for the capability's descriptive name. Some of the names may not be as intuitive as others, and therefore in Table 4 there are provided brief descriptions of the capabilities of Table 3.

TABLE 4

| CAPABILITY RESOURCES | Description |
|---|---|
| EssBandRes-Conversion | Transfer of network image that requires the resolution to be modified. |
| EssBandNoRes-Conversion | Transfer of network image that doesn't require resolution modificaton. |
| EssBand-BusGate | Transfer of a network image (without compressing image). |
| IIInternalImageFirstOriginal | Prepare for generation of test pattern images. |
| IIInternalImage | Generate test pattern images. |
| IInullImage | Generate a blank test pattern. |
| IPBlankImage | Generate a white image. |
| IPCompression | Compress an image. |
| IPDecompression | Decompress an image. |
| IPImageRepeat | Produce a m x n pattern of a single image. |
| IPNUpImage | Produce a m x n pattern of mn images. |

TABLE 4-continued

| CAPABILITY RESOURCES | Description |
|---|---|
| IPRotation | Rotate image. |
| IPCreateText | Add text to an image in memory. |
| IPDiskText | Add text to an image on disk. |
| IPAnnotation | Annotate 2 images together. |
| PGOriginal | Create an image from text. |
| ScanOriginal | Scan an original into EPC. |
| PreScan | Pre-scan an original. |
| ScanToFile | Transfer an image to the ESS for sending across the network. |
| MarkOutput | Mark an image. |

The aforenoted algorithms as embodied in FIGS. 8–15 can be carried out by any desired computer processing and MFP hardware which includes software to carry out the functions as described in these Figures. While the invention has been described with respect to two levels of queued resources, namely, CRs and BRs, it may include any desired number of levels of queued resources and corresponding data base levels. For example, it may be possible to further break down the BRs into a sub BR level or levels in an effort to gain increased productivity.

The terms Propose, Accept, NoAccept, NoAcceptHalt, SubJobComplete, Image Complete, as used herein generally refer to a signal or software request or software notification and the terms Active, Queued, queuedHalted, suspending, refer to states of a sub-job or a propose. These terms are used in a generic sense and other terms could be used in their place as desired as a name for their function and use.

The term ESS as used herein refers to an electronic subsystem used for network connectivity and decomposition of images. The term SCS as used herein refers to the strategic control system which is the digital copier control platform. They are part of the electronic control system of the MFP.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the spirit and scope of the appended claims.

What is claimed is:

1. A method for prioritizing the use of multifunctional printing system's basic processing resources to efficiently transition resources from a lower priority sub-job to a higher priority sub-job, said system employing a controller with a job contention manager (JCM), said method comprising:

a) providing a plurality of basic resources of the printing system with each of said basic resources having a job queue;

b) one or more job services, at a desired time, sending a signal, comprising a propose, to said JCM to carry out a sub-job of a given job, said propose, for each of said sub-jobs, including information about the respective sub-job's priority;

c) responsive to said propose, said JCM adding a corresponding basic job resource sub-job to the queues of each basic resource which said sub-job will require in order to perform the proposed sub-job;

d) one of said job services sending to said JCM a first sub-job propose for a first sub-job;

e) said JCM determining the state of said first sub-job, such that if said first sub-job is at the top of all the basic resource job queues for all the basic resources it requires, its state is active and said first sub-job is processed by said basic resources;

f) said JCM determining the state of said first sub-job propose, said state being "in progress" if said proposed sub-job is being actively processed or said state being "not active" if said proposed sub-job is not being actively processed;

g) one of said job services sending to said JCM a second sub-job propose for a second sub-job using at least one basic resource required by said first proposed sub-job, said second proposed sub-job having a higher priority than said first sub-job;

h) said JCM substantially immediately transitioning said at least one basic resource for use by said second proposed sub-job, if the state of said first sub-job's propose is "not active".

2. A method as in claim 1 wherein, said sub-jobs are placed in said queues of said basic resources in the order of their priority.

3. A method as in claim 2 wherein, if the state of said first sub-job's propose is in progress", said JCM transitions said at least one basic resource for use by said second proposed sub-job at such time as said propose for said first sub-job has reached a" not active" state.

4. A method as in claim 3 wherein, if said first sub-job's propose's state is "not active" said first sub-job's state is set to "QueuedHalted" and said JCM forwards a "NoAcceptHalt to the job service proposing said first sub-job, and wherein said JCM signals said job service to remove the halt and propose again when said second sub-job is completed.

5. A resource based method of managing the processing of a plurality of jobs in a multifunctional printing system in which at least one job is inputted for processing at one or more job services, said system including a controller with a job contention manager (JCM) for prioritizing the use of the printing system's basic processing resources to efficiently transition resources from a lower priority sub-job to a higher priority sub-job, said method comprising:

a) including in at least a first level of a database a plurality of capability resources associated with sub-jobs of said one or more job services and including in at least a second level of said database a plurality of basic resources of the printing system, with each capability resource containing a list of the basic resources it needs to carry out its capability and each basic resource containing a list of the capability resources that depend upon it;

b) each capability resource and each basic resource including a sub-job queue;

c) each respective job service, at a desired time, sending a signal, comprising a propose, to said JCM to carry out a sub-job of a given job, said propose for each of said sub-jobs including information about the respective sub-job's priority;

d) responsive to said propose, said JCM creating for each sub-job received from a job service a respective capability job resource containing said information, and adding each such capability job resource, based on priority, to the respective capability resource job queue;

e) responsive to said propose said JCM adding for each capability job resource, based on priority, component basic job resources to the queues of each basic resource which a respective capability job resource will require;

f) one of said job services providing to said JCM a first sub-job propose for a first sub-job;

g) said JCM determining the state of said first sub-job, such that if said first sub-job is at the top of all the basic resource job queues for all the basic resources it requires its state is active and said first sub-job is processed by said basic resources;

h) said JCM determining the state of said first sub-job propose, said state being "in progress" if said proposed sub-job is being actively processed or said state being not active if said proposed sub-job is not being actively processed;

i) one of said job services providing to said JCM a second sub-job propose for a second sub-job using at least one basic resource required by said first proposed sub-job, said second proposed sub-job having a higher priority than said first sub-job; and j) said JCM substantially immediately transitioning said at least one basic resource for use by said second proposed sub-job, if the state of said first sub-job's propose is not active.

6. A method as in claim 5 wherein, if the state of said first sub-job's propose is "in progress", said JCM transitions said at least one basic resource for use by said second proposed sub-job at such time as said propose for said first sub-job has completed.

7. A method as in claim 6 wherein, if said first sub-job's propose's state is "not active" said first sub-job's state is set to "QueuedHalted" and said JCM forwards a "NoAcceptHalt to the job service proposing said first sub-job, and wherein said JCM signals said job service to remove the halt and propose again when said second sub-job is completed.

8. An apparatus for prioritizing the use of multifunctional printing system's basic processing resources to efficiently transition resources from a lower priority sub-job to a higher priority sub-job comprising:

a) a controller with a job contention manager (JCM);

b) a plurality of basic resources of the printing system with each of said basic resources having a job queue;

c) means for one or more job services, at a desired time, sending a signal, comprising a propose, to said JCM to carry out a sub-job of a given job, said propose, for each of said sub-jobs, including information about the respective sub-job's priority;

c) means responsive to said propose, for said JCM to add a corresponding basic job resource sub-job to the queues of each basic resource which said sub-job will require in order to perform the proposed sub-job;

d) means responsive to one of said job services sending to said JCM a first sub-job propose for a first sub-job for determining the state of said first sub-job, such that if said first sub-job is at the top of all the basic resource job queues for all the basic resources it requires, its state is active and said first sub-job is processed by said basic resources;

e) said JCM including means for determining the state of said first sub-job propose, said state being "in progress" if said proposed sub-job is being actively processed or said state being "not active" if said proposed sub-job is not being actively processed;

f) resource transitioning means, responsive to one of said job services sending to said JCM a second sub-job propose for a second sub-job using at least one basic resource required by said first proposed sub-job, said second proposed sub-job having a higher priority than said first sub-job, for substantially immediately transitioning said at least one basic resource for use by said second proposed sub-job, if the state of said first sub-job's propose is "not active".

9. An apparatus as in claim 8 wherein, if the state of said first sub-job's propose is "in progress", said resource transition means, transitions said at least one basic resource for use by said second proposed sub-job at such time as said propose for said first sub-job has reached a "not active" state.

10. An apparatus as in claim 9 wherein, if said first sub-job's propose's state is "not active" said JCM includes means for setting said first sub-job's state to "QueuedHalted" and means for forwarding a "NoAcceptHalt" to the job service proposing said first sub-job, and wherein said JCM includes means for signaling said job service proposing said first job to remove the halt and propose again when said second sub-job is completed.

11. An apparatus for managing the processing of a plurality of jobs in a multifunctional printing system to efficiently transition resources from a lower priority sub-job to a higher priority sub-job, said apparatus comprising:
  a) a controller with a job contention manager (JCM) for prioritizing the use of the printing system's basic processing resources
  b) a database including in at least a first level a plurality of capability resources associated with sub-jobs of said one or more job services and including in at least a second level a plurality of basic resources of the printing system, with each capability resource containing a list of the basic resources it needs to carry out its capability and each basic resource containing a list of the capability resources that depend upon it;
  c) each capability resource and each basic resource including a sub-job queue;
  d) means for one or more job services, at a desired time, to send a signal, comprising a propose, to said JCM to carry out a sub-job, said propose for each of said sub-jobs including information about the respective sub-job's priority;
  e) said JCM including means responsive to a propose, for creating for each sub-job received from a job service a respective capability resource containing said information, and adding each such capability resource, based on priority, to the respective capability resource job queue;
  f) said JCM including means responsive to said creation of said capability resource for adding for each capability resource, component basic resources to the job queues of each basic resource which a respective capability resource will require;
  g) state determining means, responsive to one of said job services sending to said JCM a first sub-job propose for a first sub-job, for determining the state of said first sub-job, such that if said first sub-job is at the top of all the basic resource job queues for all the basic resources it requires, its state is active and said first sub-job is processed by said basic resources;
  h) said JCM including means for determining the state of said first sub-job propose, said state being "in progress" if said proposed sub-job is being actively processed or said state being "not active" if said proposed sub-job is not being actively processed;
  i) resource transitioning means, responsive to one of said job services sending to said JCM a second sub-job propose for a second sub-job, using at least one basic resource required by said first proposed sub-job, said second proposed sub-job having a higher priority than said first sub-job, for substantially immediately transitioning said at least one basic resource for use by said second proposed sub-job, if the state of said first sub-job's propose is "not active".

12. An apparatus as in claim 11 wherein, if the state of said first sub-job's propose is "in progress", said resource transition means, transitions said at least one basic resource for use by said second proposed sub-job at such time as said propose for said first sub-job has completed.

13. An apparatus as in claim 9 wherein, if said first sub-job's propose's state is "not active" said JCM includes means for setting said first sub-job's state to "QueuedHalted" and means for forwarding a "NoAcceptHalt" to the job service proposing said first sub-job, and wherein said JCM includes means for signaling said job service proposing said first job to remove the halt and propose again when said second sub-job is completed.

* * * * *